(12) United States Patent
Takabayashi et al.

(10) Patent No.: US 11,936,210 B2
(45) Date of Patent: Mar. 19, 2024

(54) POWER TRANSMISSION APPARATUS, POWER RECEPTION APPARATUS, AND POWER TRANSMISSION CONTROL METHOD

(71) Applicant: Space Power Technologies Inc., Kyoto (JP)

(72) Inventors: Nobuyuki Takabayashi, Kyoto (JP); Atsushi Kishimoto, Kyoto (JP); Minoru Furukawa, Kyoto (JP); Takuji Morita, Kyoto (JP); Yuji Takeda, Kyoto (JP)

(73) Assignee: Space Power Technologies Inc., Kyoto (JP)

( * ) Notice: Subject to any disclaimer, the term of this patent is extended or adjusted under 35 U.S.C. 154(b) by 196 days.

(21) Appl. No.: 17/538,104

(22) Filed: Nov. 30, 2021

(65) Prior Publication Data

US 2022/0094212 A1 Mar. 24, 2022

Related U.S. Application Data

(63) Continuation of application No. PCT/JP2021/028866, filed on Aug. 4, 2021.

(30) Foreign Application Priority Data

Aug. 18, 2020 (JP) ................ 2020-137915

(51) Int. Cl.
*H02J 50/80* (2016.01)
*H02J 50/20* (2016.01)
*H02J 50/40* (2016.01)

(52) U.S. Cl.
CPC .............. *H02J 50/80* (2016.02); *H02J 50/20* (2016.02); *H02J 50/402* (2020.01)

(58) Field of Classification Search
CPC ...................................................... H02J 50/80
(Continued)

(56) References Cited

U.S. PATENT DOCUMENTS

2014/0285030 A1* 9/2014 Nakamura .............. B60L 50/51
307/104
2017/0063166 A1 3/2017 Shimokawa et al.
(Continued)

FOREIGN PATENT DOCUMENTS

EP 3315351 A2 5/2018
JP 2006-238548 A 9/2006
(Continued)

OTHER PUBLICATIONS

International Search Report dated Sep. 14, 2021 in International Application No. PCT/JP2021/028866; 3pgs.

*Primary Examiner* — Joseph Chang
(74) *Attorney, Agent, or Firm* — Maier & Maier, PLLC

(57) ABSTRACT

A power transmission apparatus includes a controller that controls a power transmitter that performs wireless power transmission. The controller is configured to: cause the processor to: cause the power transmitter to emit a first power transmission beam for which a first power is set; acquire feedback information on a result of reception of the first power transmission beam in a power reception apparatus; identify a power receiving capability in the power reception apparatus; and determine, with reference to the power receiving capability and the reception result, a second power which is usable in wireless power supply for the power reception apparatus and which is larger than the first power. The power receiving capability includes a maximum value of an input power range of the power reception (Continued)

apparatus. The wireless power transmission uses an electromagnetic wave having a frequency equal to or higher than that of a microwave.

8 Claims, 30 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2017/0237302 A1* | 8/2017 | Sorge | H02J 50/12 |
| | | | 307/104 |
| 2018/0145545 A1 | 5/2018 | Azami et al. | |
| 2019/0214855 A1 | 7/2019 | Abiri et al. | |

FOREIGN PATENT DOCUMENTS

| | | |
|---|---|---|
| JP | 2016-111791 A | 6/2016 |
| JP | WO2017006482 A1 | 1/2017 |
| JP | 2017-163641 A | 9/2017 |
| JP | 2018-74777 A | 5/2018 |
| WO | 2015/177905 A1 | 11/2015 |

* cited by examiner

[FIG. 1]
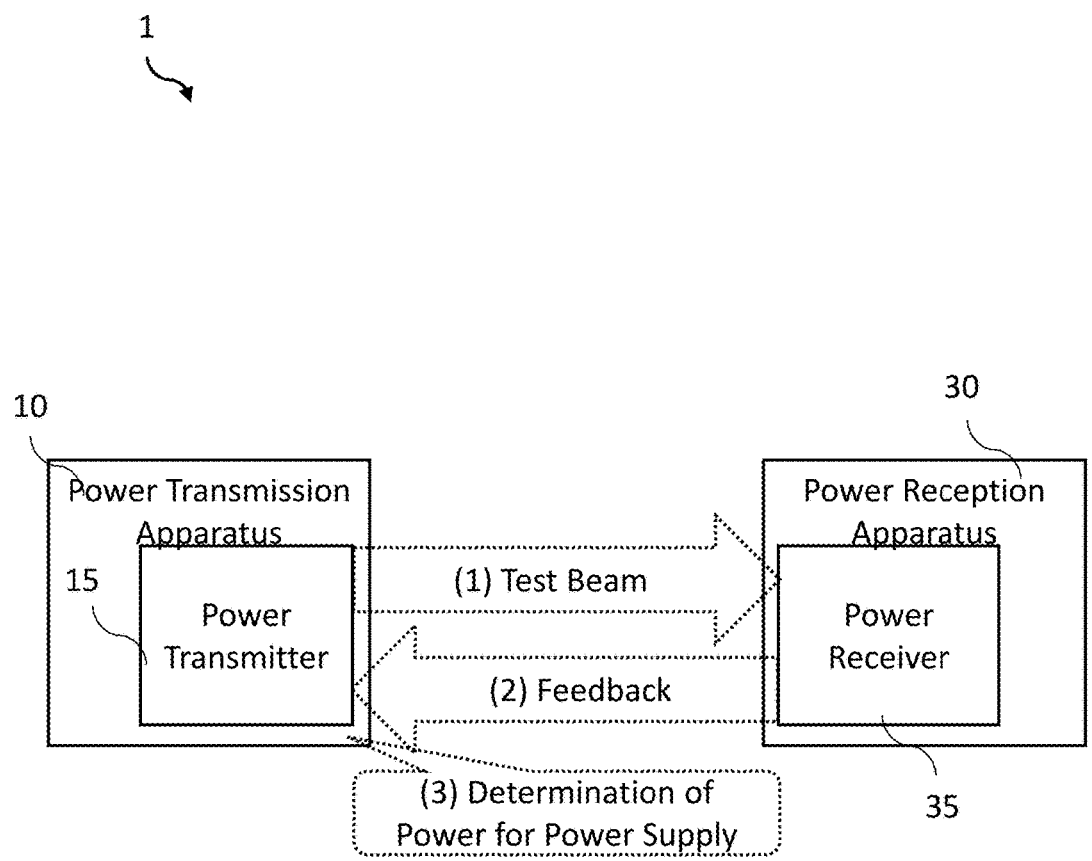

[FIG. 2]
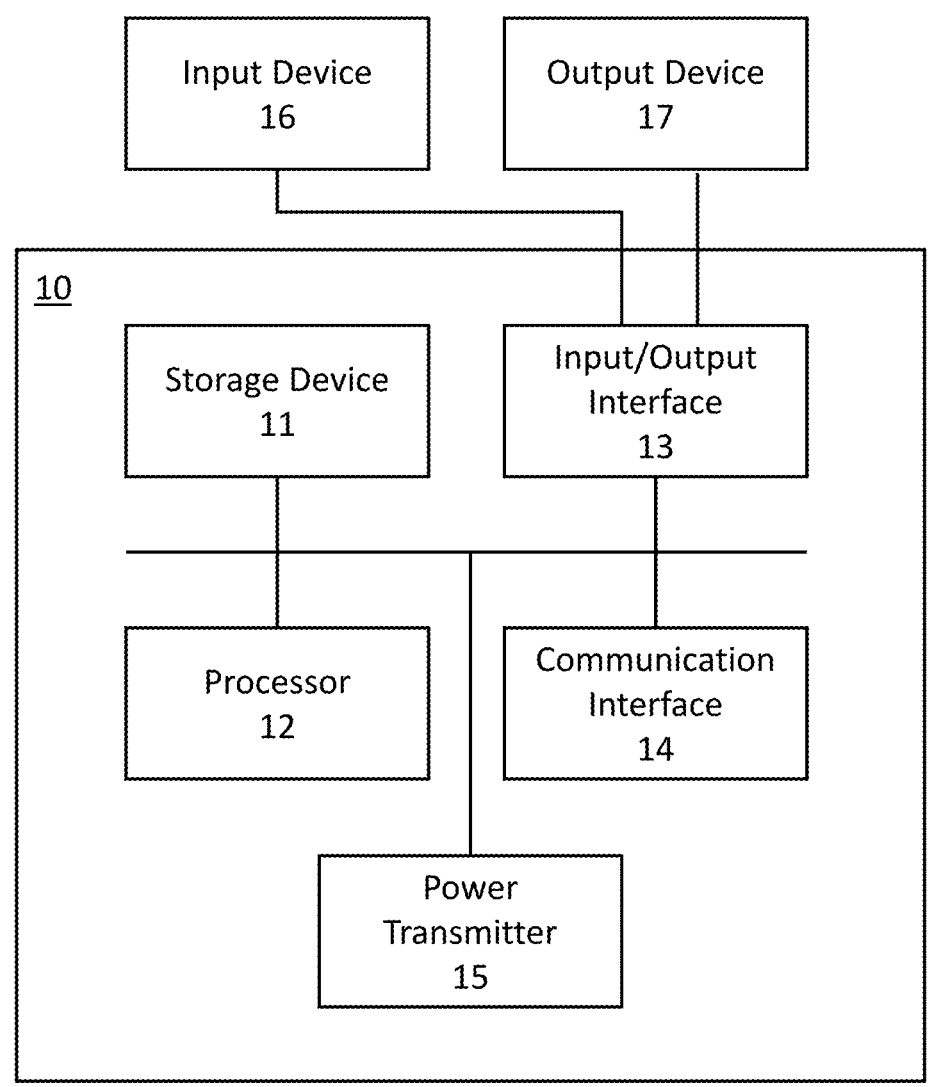

[FIG. 3]
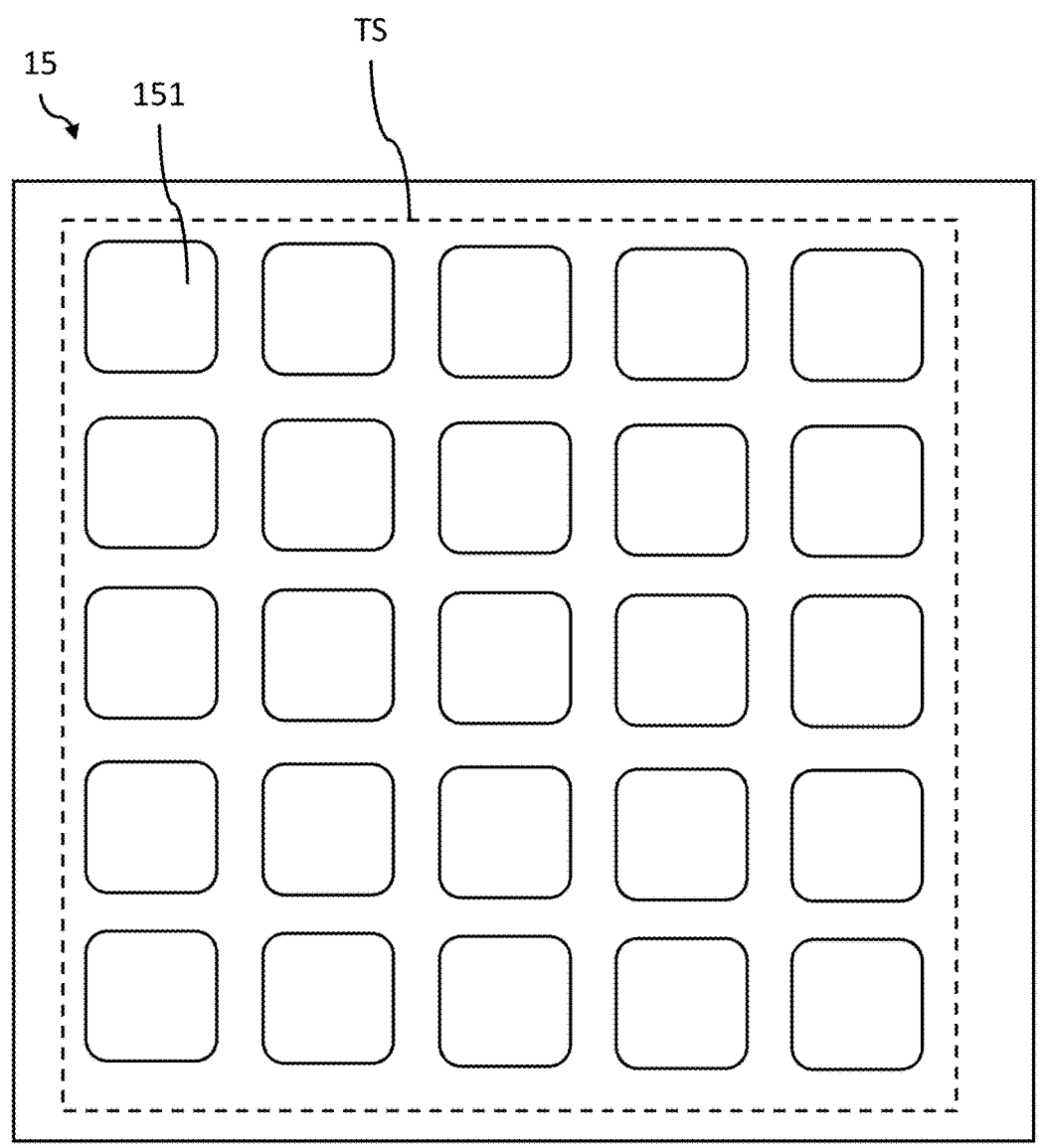

[FIG. 4]
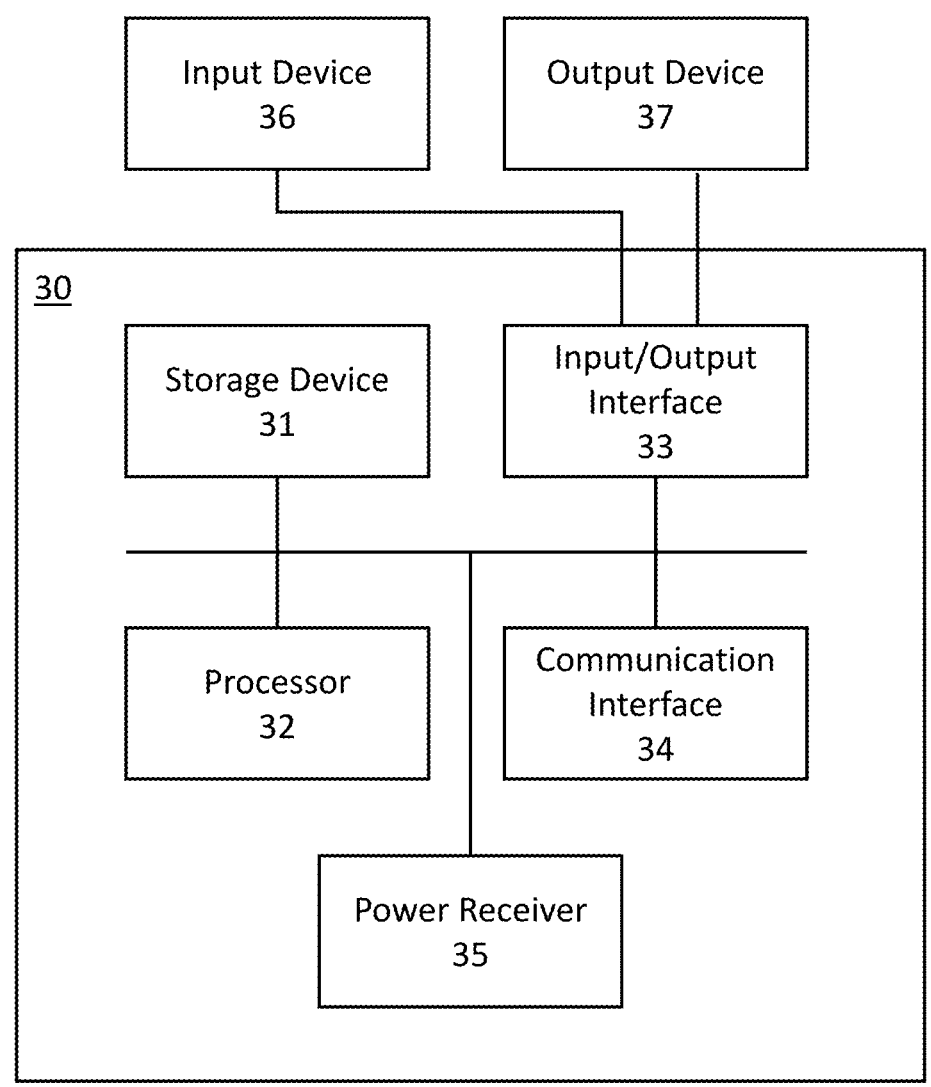

[FIG. 5]
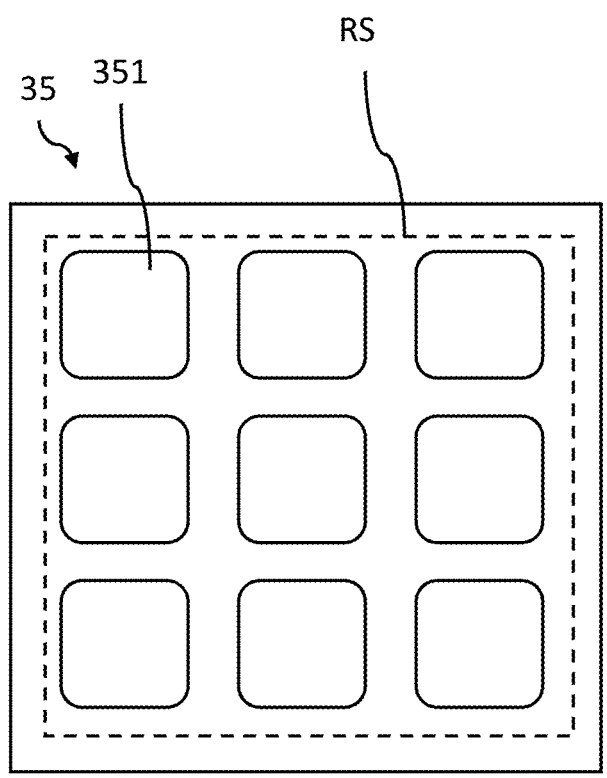

[FIG. 6]
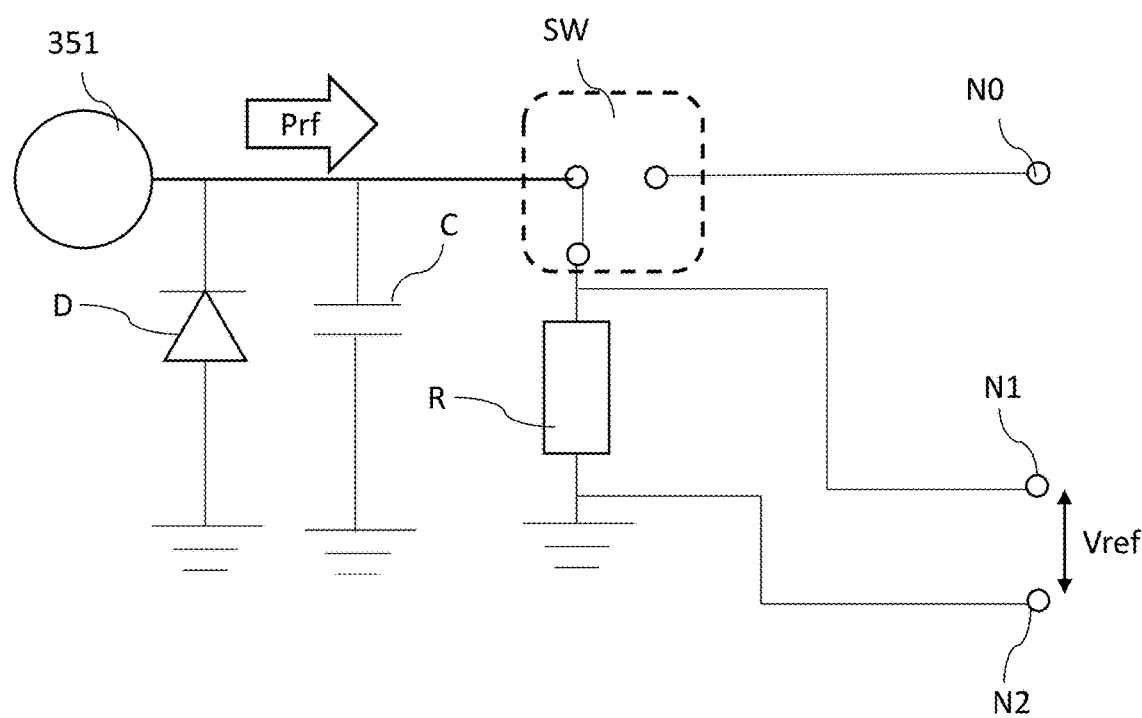

[FIG. 7]
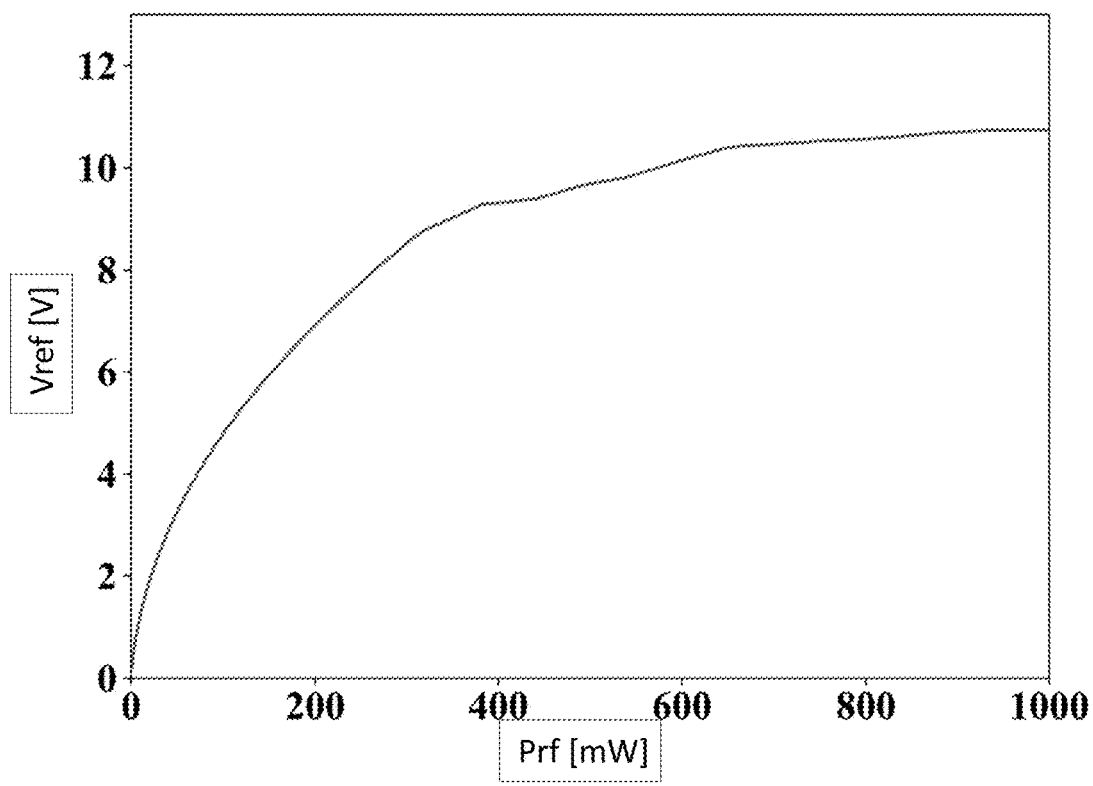

[FIG. 8]

Power Reception Class Database

| Class | Input Power Range | Output Power Range | Frequency | Antenna Configuration | | | |
|---|---|---|---|---|---|---|---|
| | | | | Interval | Element Number | Arrangement | · |
| Class A | 100 - 500 [mW] | 70 - 300 [mW] | 5 GHz | · | · | · | · |
| Class B | 0.5 - 1.5 [W] | 0.3 - 1 [W] | 24 GHz | · | · | · | · |
| Class B | 1.5 - 10 [W] | 1.0 - 7.0 [W] | 48 GHz | · | · | · | · |
| · | · | · | · | · | · | · | · |

[FIG. 9]
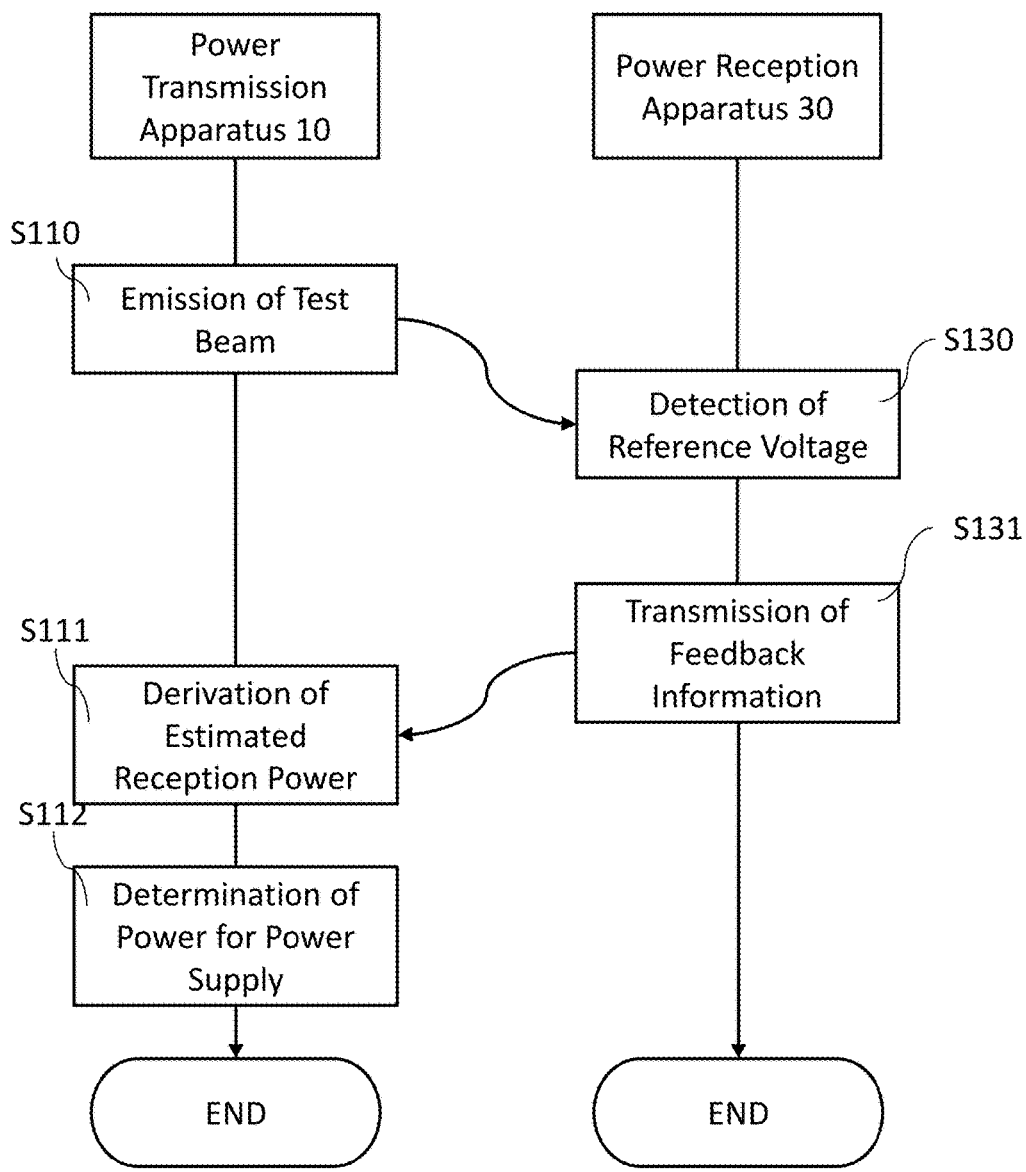

[FIG. 10]
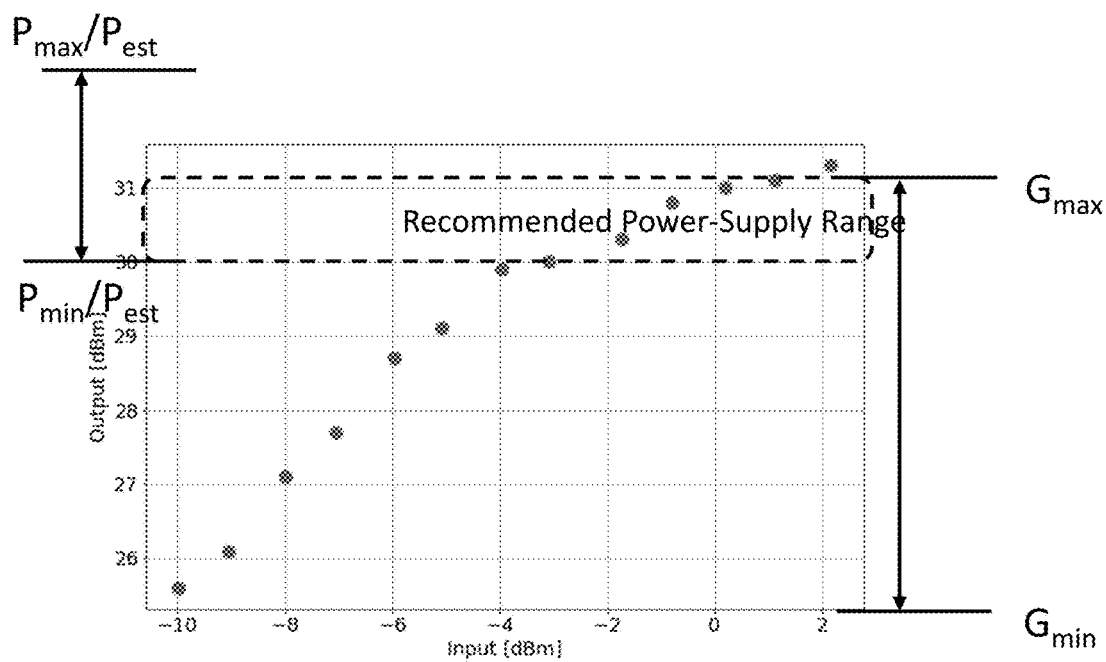

[FIG. 11]
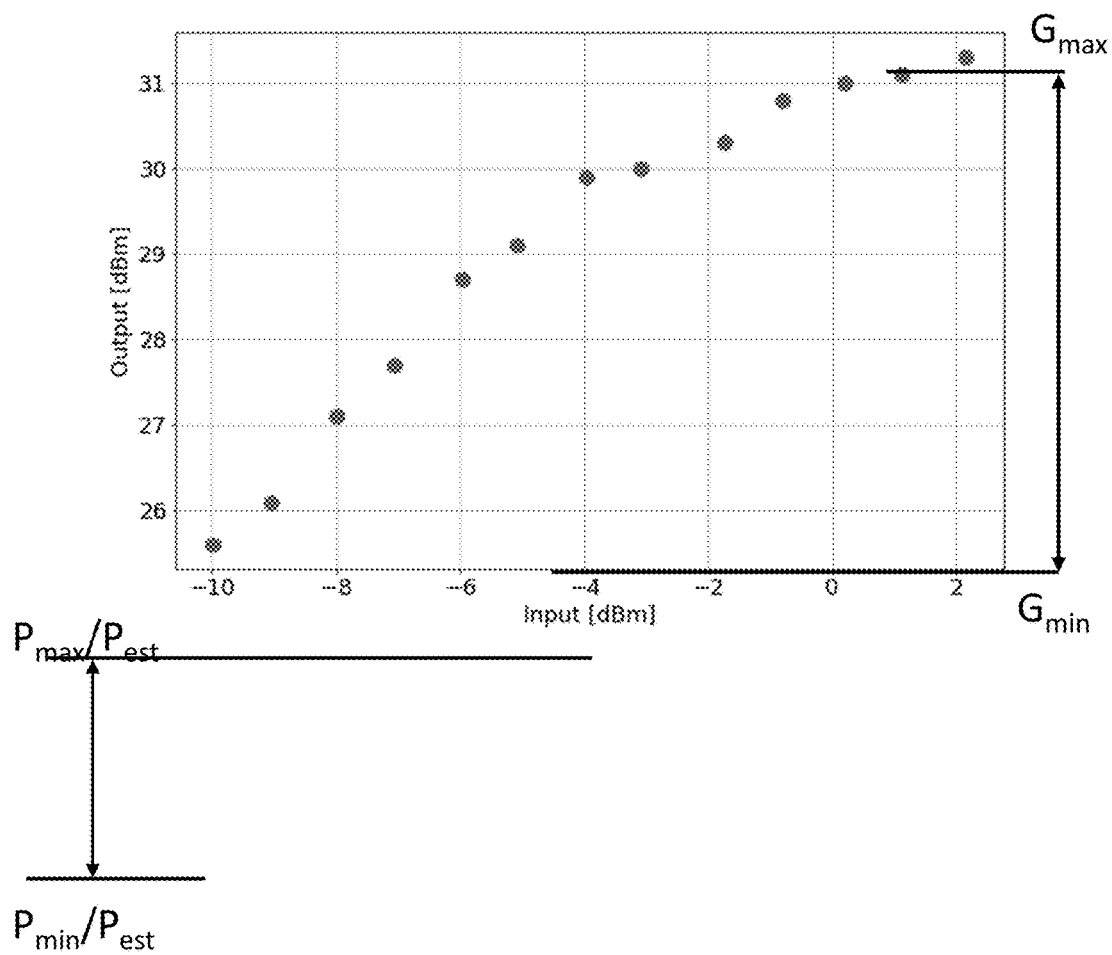

[FIG. 12]
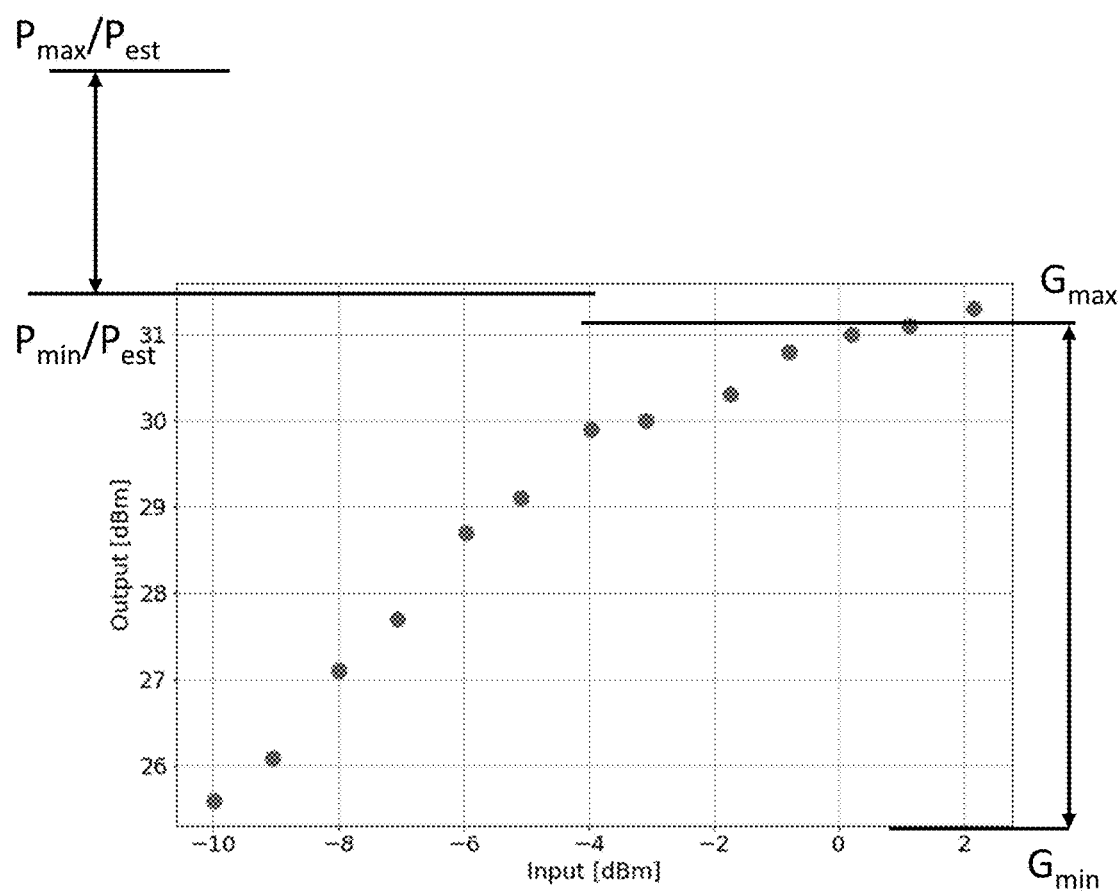

[FIG. 13]
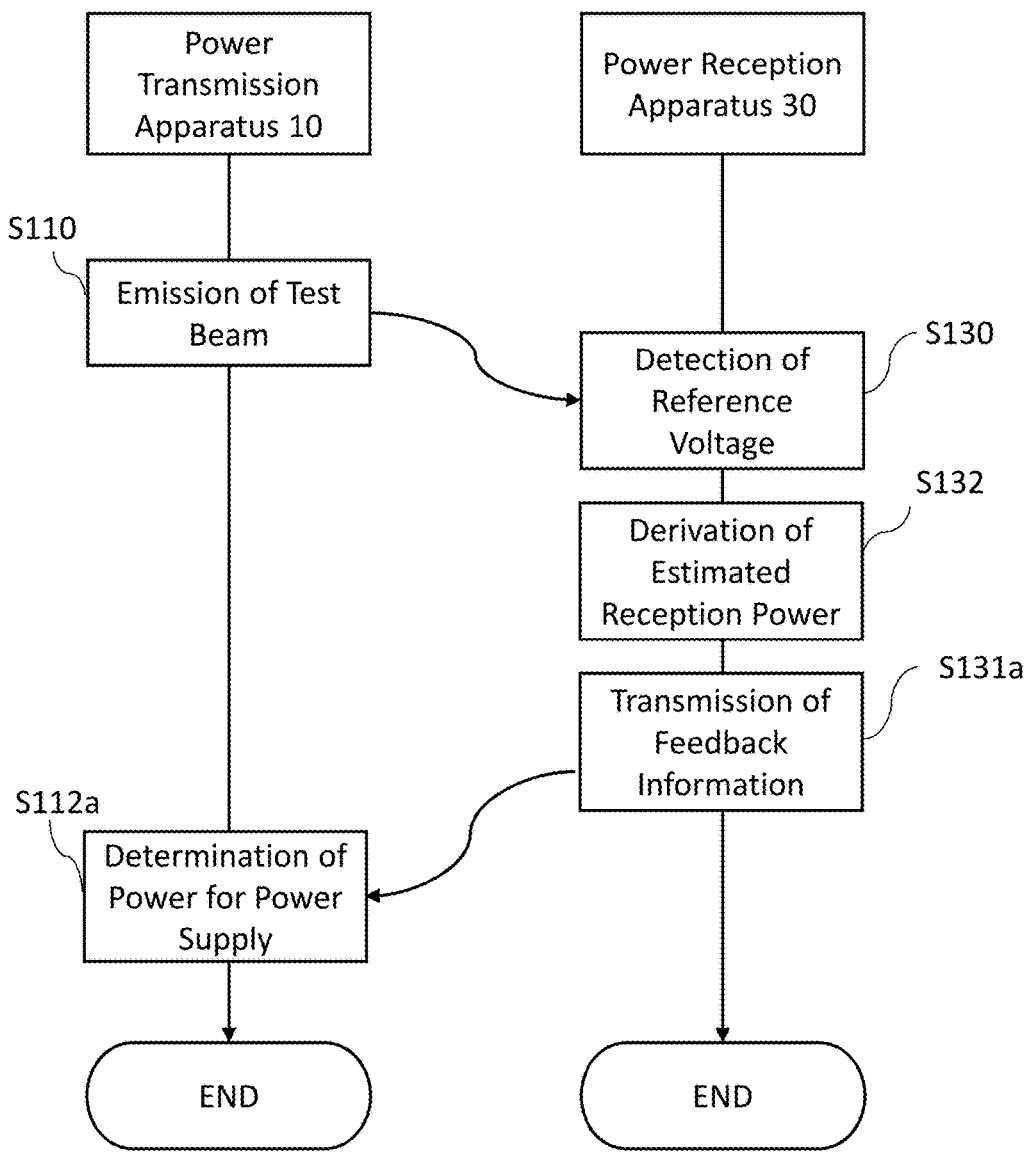

[FIG. 14]
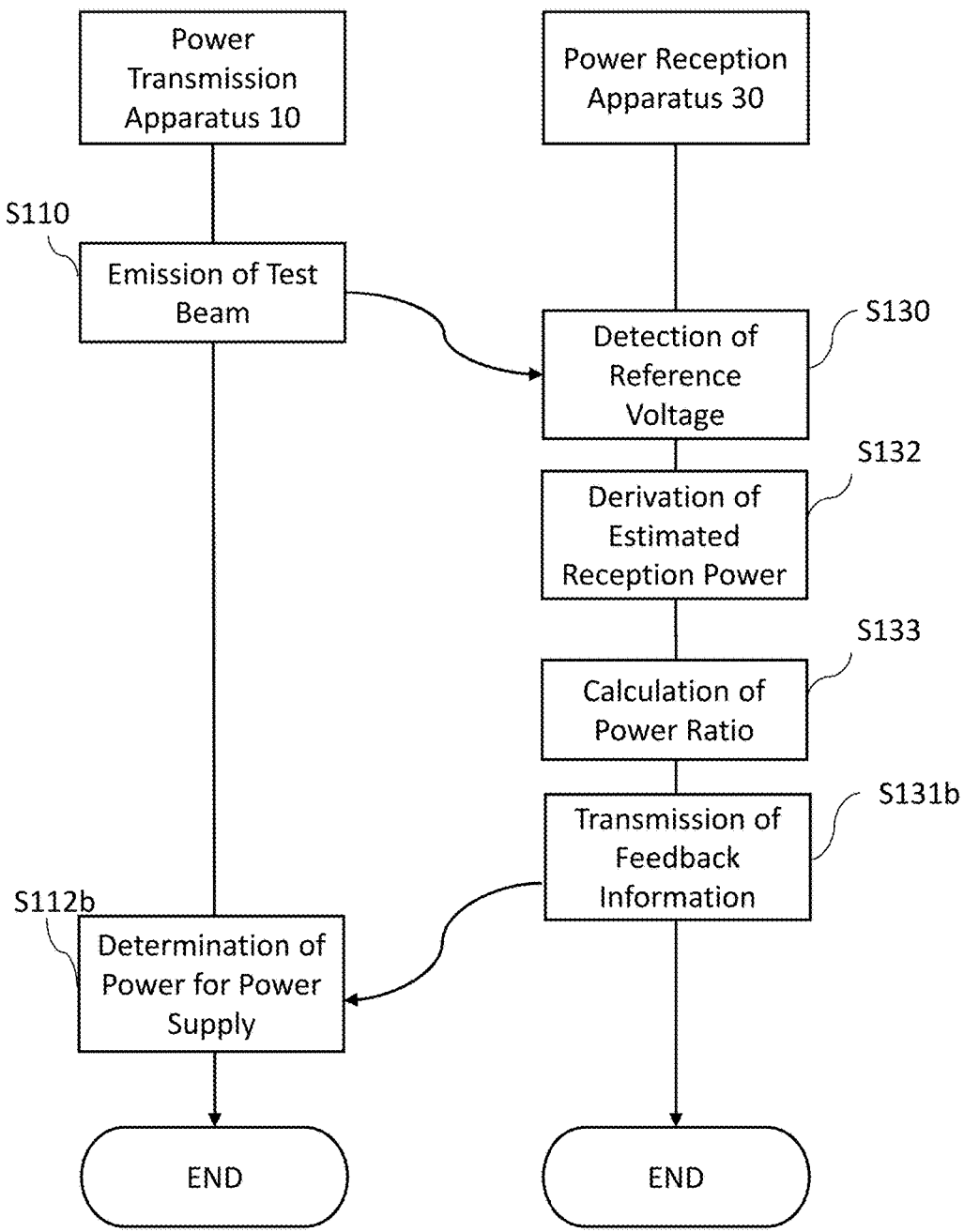

[FIG. 15]
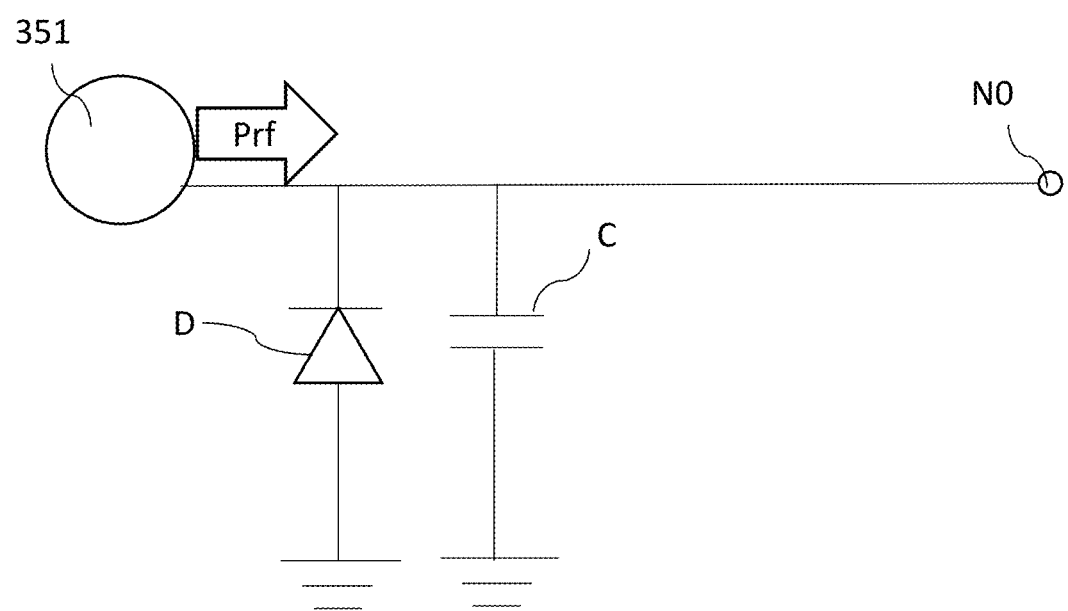

[FIG. 16]
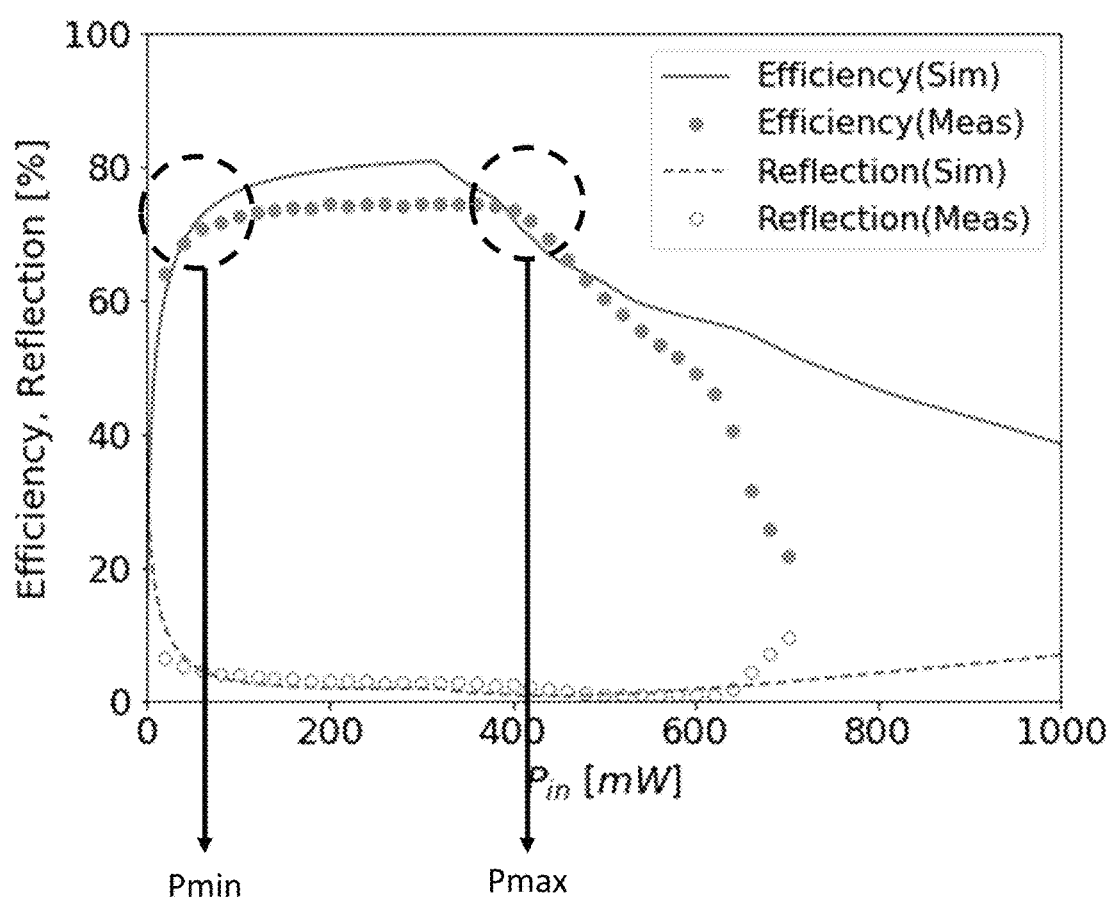

[FIG. 17]
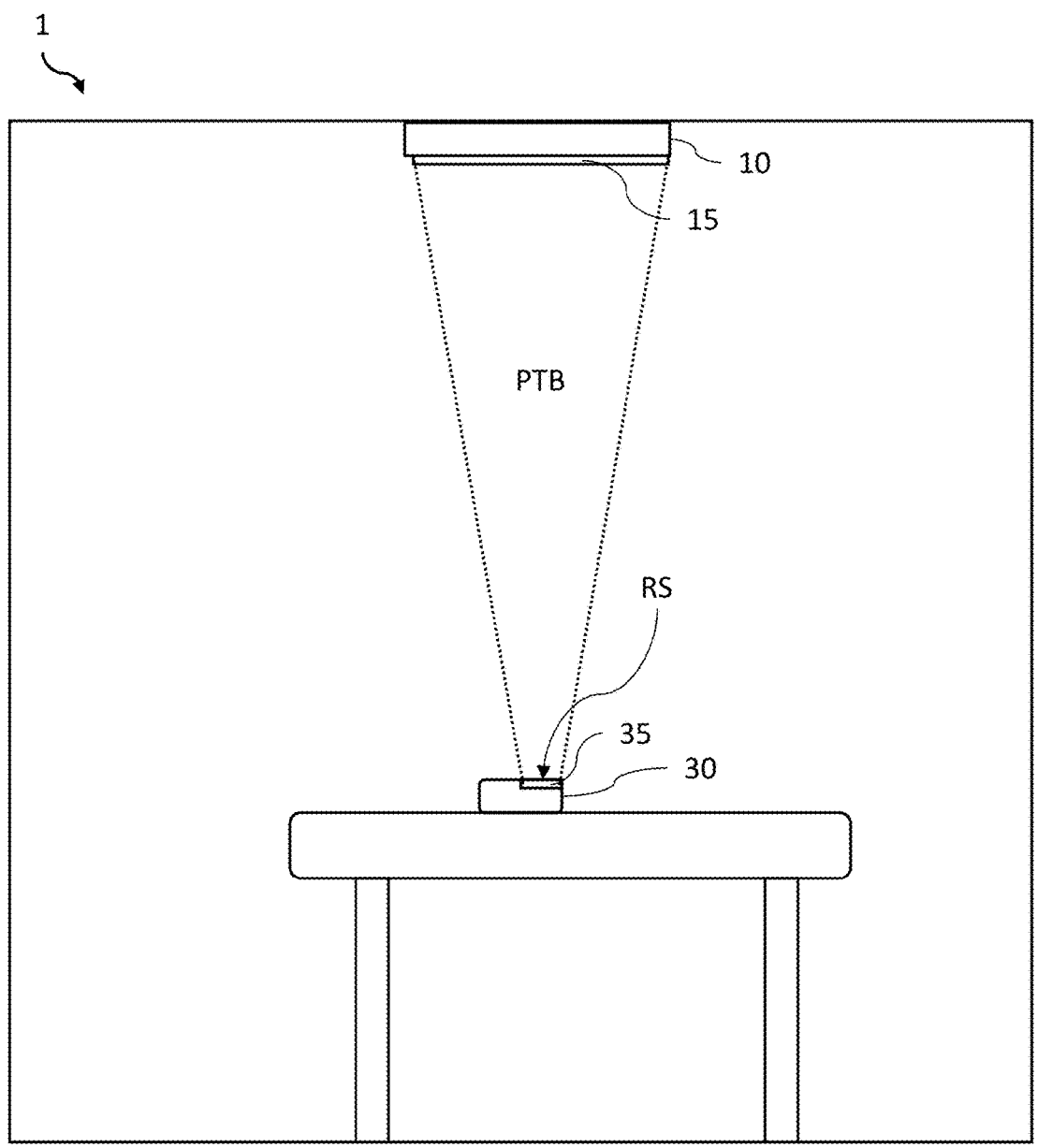

[FIG. 18]
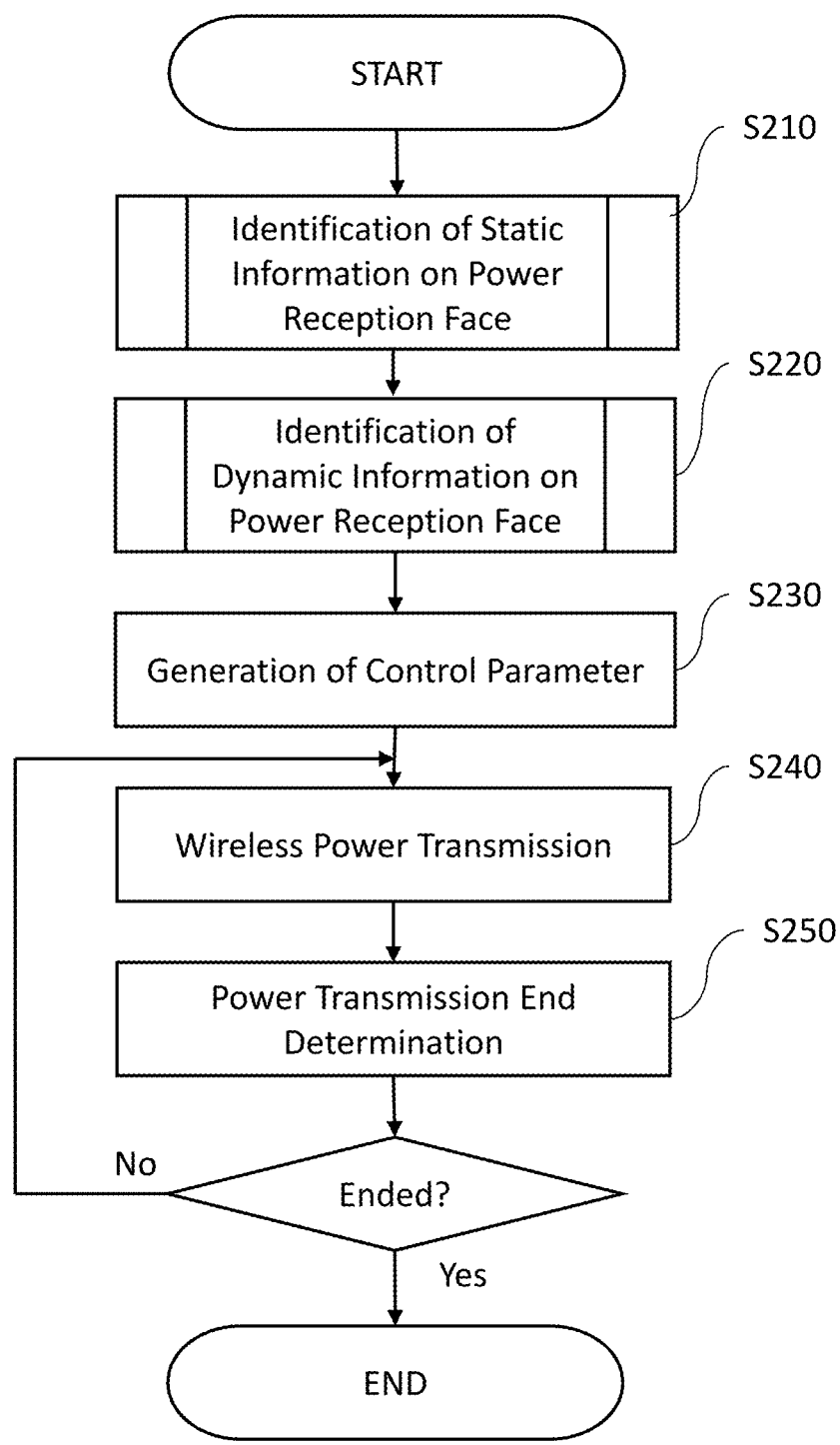

[FIG. 19]
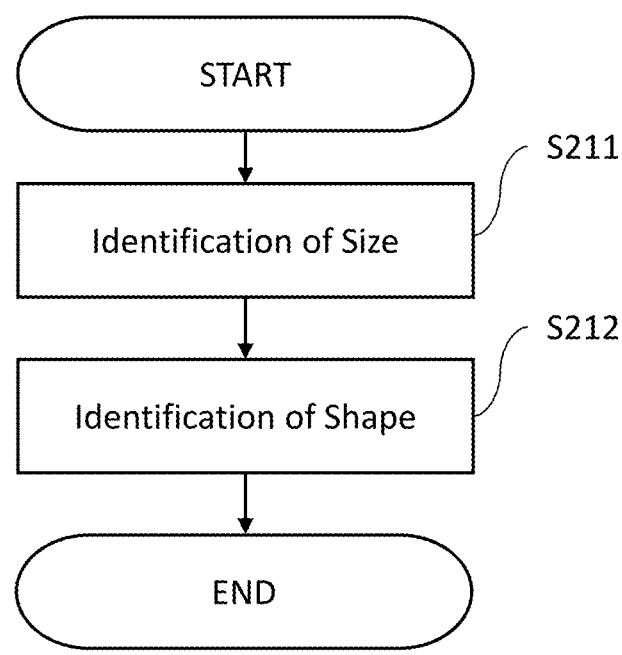

[FIG. 20]
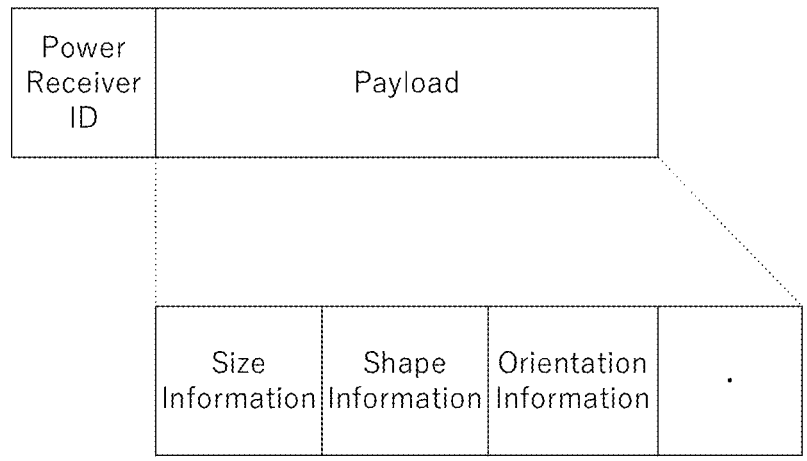

[FIG. 21]
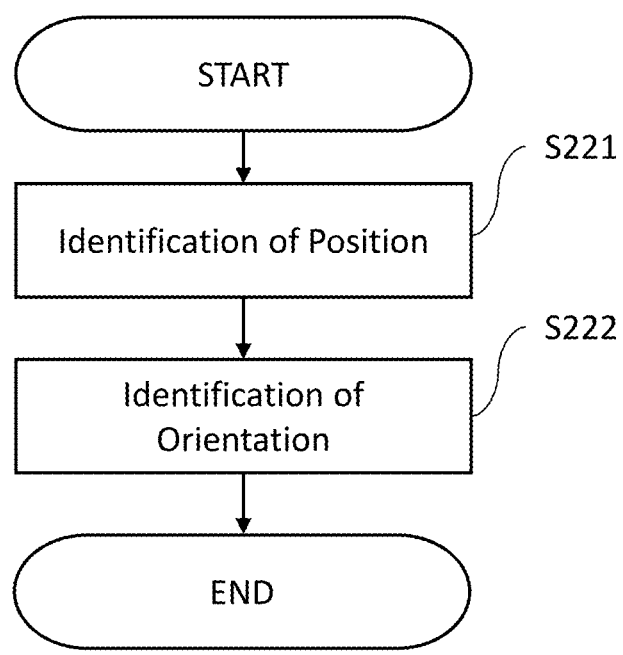

[FIG. 22]
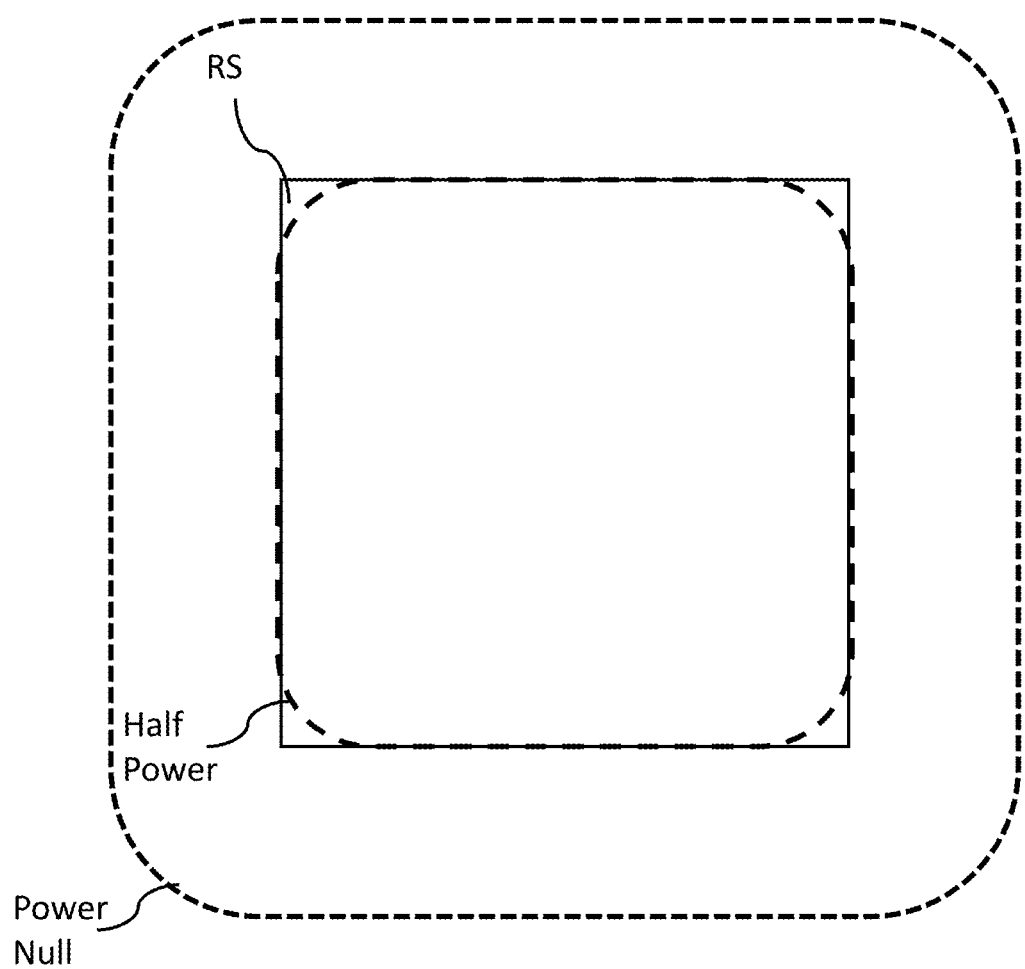

[FIG. 23]
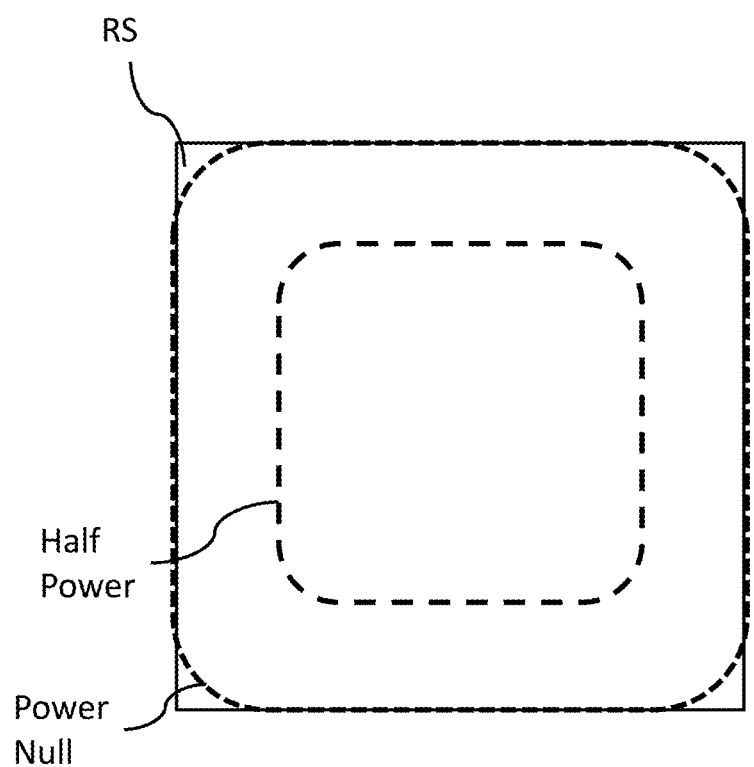

[FIG. 24]
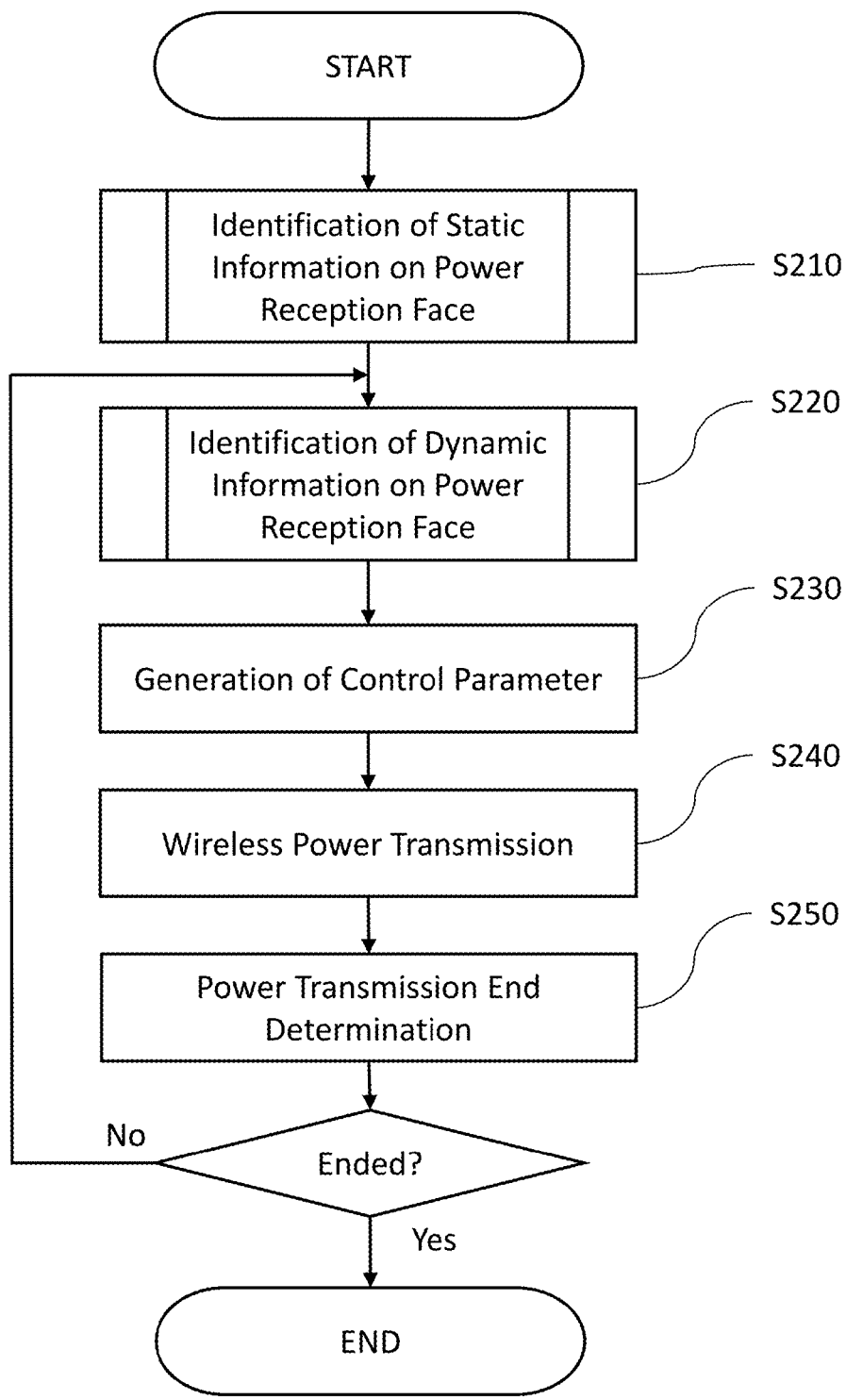

[FIG. 25]
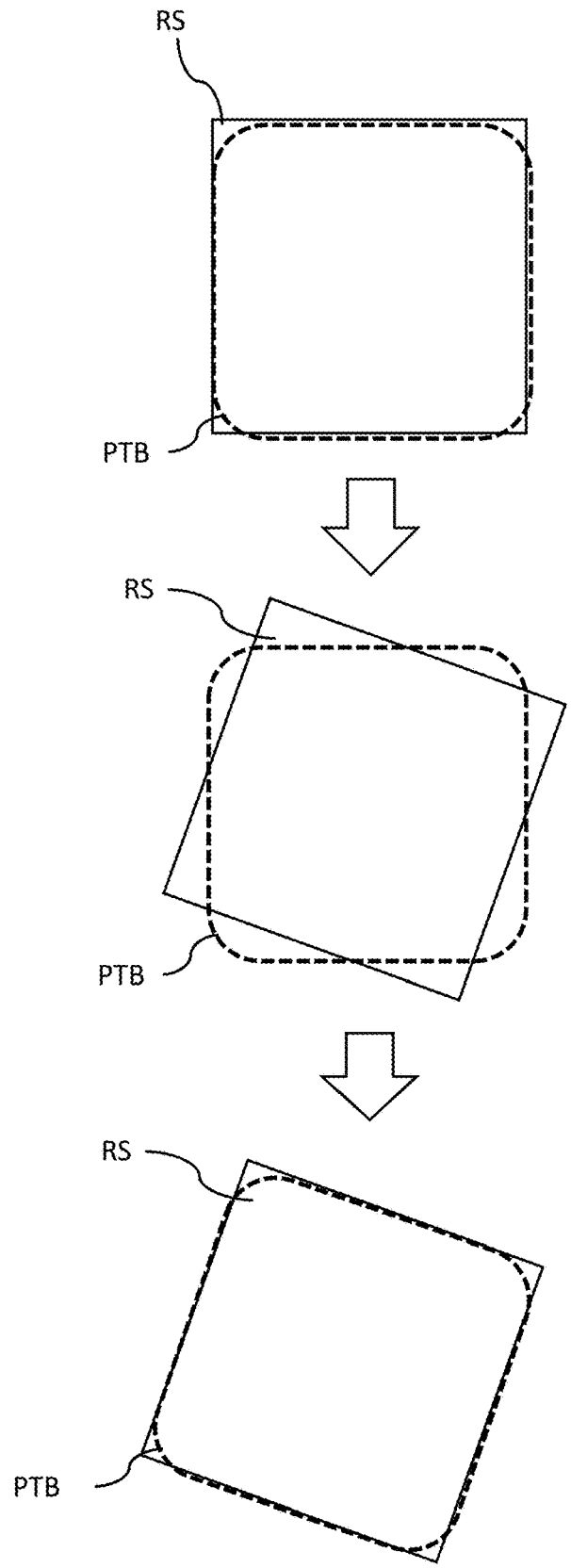

[FIG. 26]

Power Reception Class Database

| Power Receiver ID | Shape | Size | · |
|---|---|---|---|
| R001 | Rectangle | 4cm * 3cm | · |
| R002 | Circle | r=2cm | · |
| · | · | · | · |

[FIG. 27]
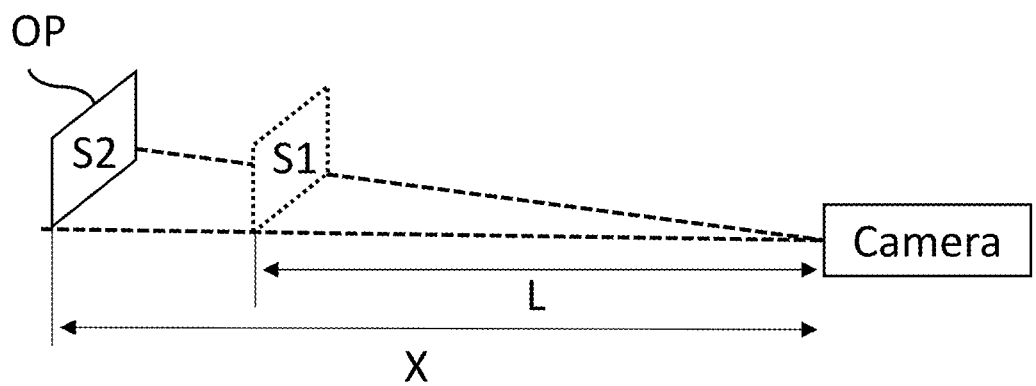

[FIG. 28]
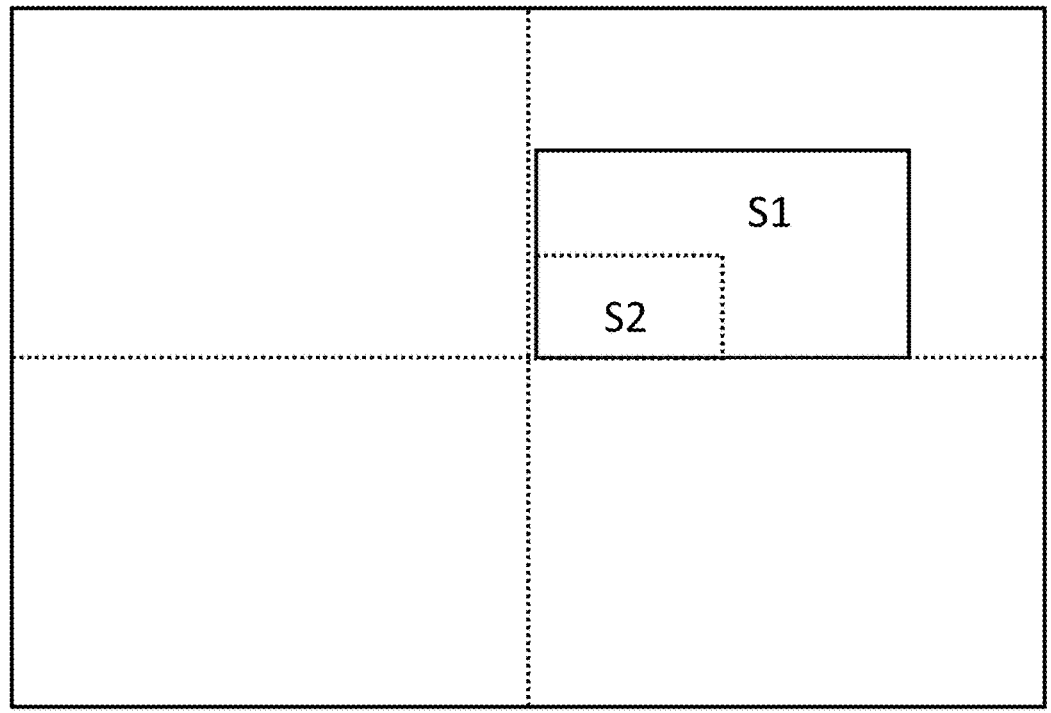

[FIG. 29]
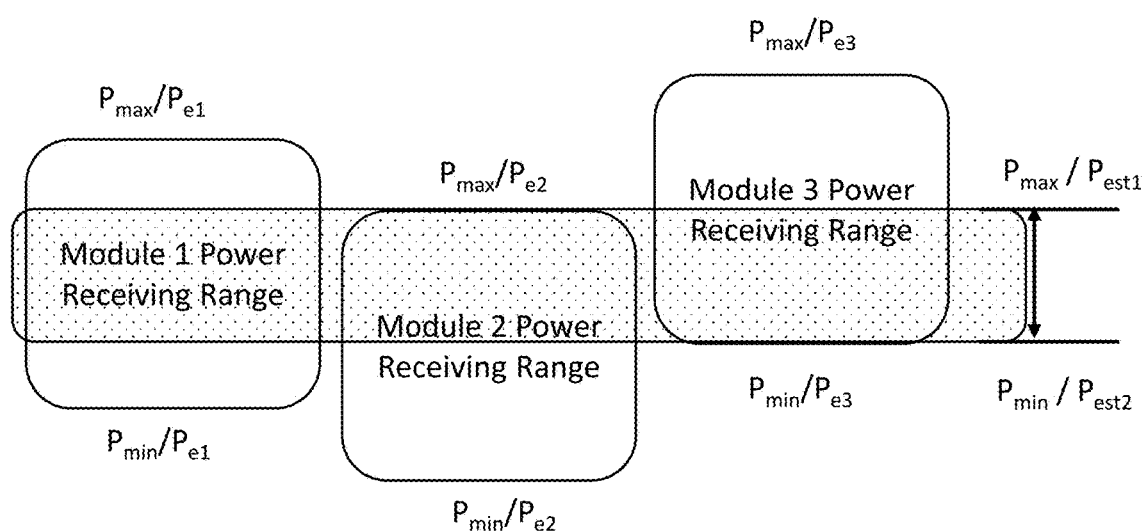

[FIG. 30]
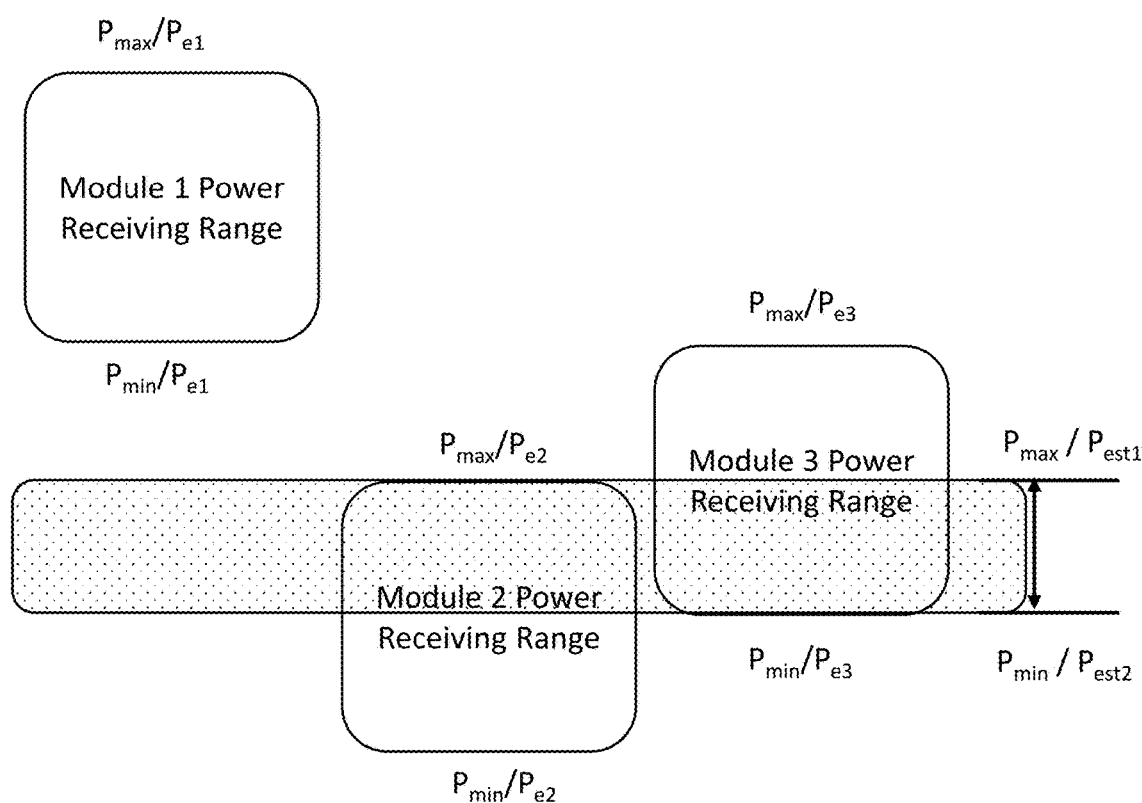

POWER TRANSMISSION APPARATUS, POWER RECEPTION APPARATUS, AND POWER TRANSMISSION CONTROL METHOD

CROSS-REFERENCE TO RELATED APPLICATIONS

This application is a Continuation Application of No. PCT/JP2021/028866, filed on Aug. 4, 2021, and the PCT application is based upon and claims the benefit of priority from Japanese Patent Application No. 2020-137915, filed on Aug. 18, 2020, the entire contents of which are incorporated herein by reference.

FIELD

The present disclosure relates to a power transmission apparatus, a power reception apparatus, a power transmission control method, a power transmission control program, a power reception control method, and a power reception control program.

BACKGROUND

In the field of wireless power supply, it is required to realize highly efficient power transmission.

U.S. Patent Application Publication No. 2019/0214855 discloses that a signal backscattered by a mobile device is used to vary the phases of individual transmitting elements of an RF transmitter array in order to maximize the RF signal delivered to charge the mobile device.

Theoretically, it is considered that the more power transmitted to a power reception apparatus, the faster the charging of the power reception apparatus can be completed. However, there is a limit to the power receiving capability of the actual power reception device. For example, when the power reception apparatus receives power that exceeds its power receiving capability, the power reception apparatus may suffer various adverse effects such as performance degradation, deterioration, and damage.

BRIEF DESCRIPTION OF THE DRAWINGS

FIG. 1 is a block diagram showing a configuration of a wireless power supply system of the present embodiment.

FIG. 2 is a block diagram illustrating a configuration of a power transmission apparatus.

FIG. 3 is a diagram illustrating a power transmission face corresponding to the power transmitter of FIG. 2.

FIG. 4 is a block diagram illustrating a configuration of a power reception apparatus.

FIG. 5 is a diagram illustrating a power reception face corresponding to the power receiver of FIG. 4.

FIG. 6 is a diagram illustrating a circuit configuration of a power reception module provided for the power receiver of FIG. 4.

FIG. 7 is a graph illustrating the relationship between a reception power of the power reception module of FIG. 6 and a reference voltage detected by the power reception module.

FIG. 8 is a diagram showing a data structure of a power reception class database of the present embodiment.

FIG. 9 is a diagram showing an overall flow of a wireless power supply process of the present embodiment.

FIG. 10 is an illustration regarding a determination of power for power supply.

FIG. 11 is an illustration regarding a determination of power for power supply.

FIG. 12 is an illustration regarding a determination of power for power supply.

FIG. 13 is a diagram showing an overall flow of a wireless power supply process of Modification 1.

FIG. 14 is a diagram showing an overall flow of a wireless power supply process of Modification 2.

FIG. 15 is a diagram illustrating a circuit configuration of a power reception module without a detecting function.

FIG. 16 is a graph obtained by plotting efficiency with respect to input power.

FIG. 17 is an illustration of an outline of Modification 4.

FIG. 18 is a flowchart illustrating a power transmission control process of Modification 4.

FIG. 19 is a flowchart illustrating details of step S210 of FIG. 18.

FIG. 20 is a diagram illustrating a structure of information that a power transmission apparatus receives from a power reception apparatus.

FIG. 21 is a flowchart illustrating details of step S220 of FIG. 18.

FIG. 22 is a diagram illustrating an ideal beam shape.

FIG. 23 is a diagram illustrating an ideal beam shape.

FIG. 24 is a flowchart illustrating a power transmission control process of Modification 5.

FIG. 25 is an illustration of how a power transmission beam is controlled when the orientation of a power reception face changes.

FIG. 26 is a diagram illustrating a data structure of a power receiver database of Modification 6.

FIG. 27 is an illustration of a distance measurement technique using a monocular camera.

FIG. 28 is an illustration of a distance measurement technique using a monocular camera.

FIG. 29 is an illustration of a method for determining a power ratio when the power receiver includes a plurality of power reception modules.

FIG. 30 is an illustration of a method for determining a power ratio when the power receiver includes a plurality of power reception modules.

DETAILED DESCRIPTION

A power transmission apparatus according to one embodiment of the present disclosure includes a controller that controls a power transmitter that performs wireless power transmission, the controller including a processor and a memory with instructions thereon, wherein the instructions upon execution by the processor, cause the processor to: cause the power transmitter to emit a first power transmission beam for which a first power is set; acquire feedback information on a result of reception of the first power transmission beam in a power reception apparatus; identify a power receiving capability in the power reception apparatus; and determine, with reference to the power receiving capability and the reception result, a second power which is usable in wireless power supply for the power reception apparatus and which is larger than the first power, the power receiving capability including a maximum value of an input power range of the power reception apparatus, and the wireless power transmission using an electromagnetic wave having a frequency equal to or higher than that of a microwave.

Hereinafter, an embodiment of the present invention will be described in detail based on drawings. Note that in the drawings for describing the embodiment, the same components are denoted in principle by the same reference sign, and redundant descriptions thereof will be omitted.

(1) Configuration of Wireless Power Supply System

A configuration of a wireless power supply system will be described. FIG. 1 is a block diagram showing a configuration of a wireless power supply system of the present embodiment.

As shown in FIG. 1, a wireless power supply system 1 includes a power transmission apparatus 10 and a power reception apparatus 30.

The power transmission apparatus 10 and the power reception apparatus 30 are capable of wirelessly communicating with each other. The wireless communication takes any scheme such as Bluetooth (registered trademark), ZigBee (registered trademark), specific low-power wireless communication, or wireless Local Area Network (LAN).

In response to a power supply request from the power reception apparatus 30, the power transmission apparatus 10 performs wireless power supply for the power reception apparatus 30.

Specifically, the power transmission apparatus 10 and the power reception apparatus 30 operate as follows prior to the start of emission (i.e., full-scale wireless power supply) of a power transmission beam (i.e., an example of a "second power transmission beam") for which power for power supply (an example of a "second power") is set.

The power transmission apparatus 10 emits a power transmission beam (hereinafter, referred to as a "test beam") (an example of a "first power transmission beam") for which a power (an example of a "first power") weaker (i.e., lower in power level) than the power for power supply is set toward the power reception apparatus 30.

The power reception apparatus 30 transmits, to the power transmission apparatus 10, feedback information on a power receiving capability of the power reception apparatus 30 itself and on a result of the reception of the test beam.

The power transmission apparatus 10 determines, with reference to the feedback information, the power for power supply (i.e., a power usable in the wireless power supply for the power reception apparatus 30).

The power reception apparatus 30 includes a battery (not shown). The power reception apparatus 30 transmits a power supply request to the power transmission apparatus 10 and charges the battery using the energy of the power transmission beam emitted from the power transmission apparatus 10.

The power reception apparatus 30 is any electronic equipment that can be driven by a battery. By way of example, the power reception apparatus 30 is a mobile computer (e.g., a smartphone, a tablet computer, a laptop computer), a display used for warehouse picking, or a drone.

Note that the numbers of the power transmission apparatuses 10 and the power reception apparatuses 30 are one in FIG. 1, but the numbers of the power transmission apparatuses 10 and the power reception apparatuses 30 are not limited to one.

When there are a plurality of power reception apparatuses 30, the power reception apparatus 30 may have information for identifying the power reception apparatus included in the power supply request. This allows the power transmission apparatus 10 to identify the power reception apparatus 30 (a target power reception apparatus) targeted for the wireless power supply.

When there are a plurality of power transmission apparatuses 10, some of these power transmission apparatuses 10 may cooperate to perform the wireless power supply, or one of the power transmission apparatuses 10 may perform the wireless power supply. The power transmission apparatus 10 that performs the wireless power supply may be designated by the target power reception apparatus or may be determined by one or more power transmission apparatuses 10 that have received a power supply request from the target power reception apparatus.

(1-1) Configuration of Power Transmission Apparatus

A configuration of the power transmission apparatus 10 will be described. FIG. 2 is a block diagram illustrating a configuration of a power transmission apparatus. FIG. 3 is a diagram illustrating a power transmission face corresponding to the power transmitter of FIG. 2.

As shown in FIG. 2, the power transmission apparatus 10 includes a storage device 11, a processor 12, an input/output interface 13, a communication interface 14, and a power transmitter 15. The power transmission apparatus 10 is connectible to at least one of an input device 16 and an output device 17.

The storage device 11 is configured to store a program and data. The storage device 11 is, for example, a combination of read-only memory (ROM), random-access memory (RAM), and a storage (e.g., a flash memory or a hard disk).

The program includes, for example, the following program:

A program in an operating system (OS); and

An application program that executes information processing (e.g., power transmission control process).

The data includes, for example, the following data:

A database referred to in the information processing; and

Data obtained by executing the information processing (i.e., the result of executing the information processing).

The processor 12 is configured to realize a function of the power transmission apparatus 10 (in particular, a function of controlling the power transmitter 15) by activating the program stored in the storage device 11. The processor 12 is an example of a computer or a controller.

The input/output interface 13 is configured to acquire a signal (e.g., a user instruction, sensing data, or a combination thereof) from the input device 16 connected to the power transmission apparatus 10 and output the signal to the output device 17 connected to the power transmission apparatus 10.

The input device 16 is, for example, a keyboard, a pointing device, a touch screen, a sensor (e.g., an optical sensor), or a combination thereof.

The optical sensor may include, for example, at least one of the following:

A camera;

Lidar; and

A time-of-flight (ToF) camera.

The output device 17 is, for example, a display, a speaker, an alarm device, or a combination thereof. Upon receipt of an alarm-output instruction from the power transmission apparatus 10, the alarm device outputs an alarm perceivable to surrounding people. By way of example, the alarm stimulates human sense of touch, smell, or taste, not limited to human vision or hearing, thereby causing the operator to perceive at least one of the presence of the alarm itself and the contents of the alarm. The alarm device includes, for example, a light source, a lamp, a display, a projector, a machine whose physical state is electrically controllable (e.g., a motor-operated gate for inhibiting passage of a human), a smoke generator, a speaker, a vibrator, a mist generator, an odor generator, a taste stimulator (e.g., a mouthpiece-type device capable of supplying a taste stimulant to the tongue of a wearer), or a combination thereof.

The communication interface 14 is configured to control communications between the power transmission apparatus 10 and an external device (e.g., the power reception apparatus 30).

By way of example, the communication interface 14 is a wireless communication module that supports at least one scheme of Bluetooth, ZigBee, specific low-power wireless communication, or wireless LAN.

The power transmitter 15 is configured to emit an electromagnetic wave for power supply as a power transmission beam (i.e., perform wireless power transmission) in response to a control signal from the processor 12. The electromagnetic wave for power supply is, for example, a microwave or a lightwave (laser beam or LED light). In the following description, the electromagnetic wave for power supply is a microwave.

Specifically, the power transmitter 15 includes a signal source, a signal processing circuit, and an antenna (an example of a "beam-emitting element").

The signal source is, for example, an oscillator that generates the electromagnetic wave for power supply.

The signal processing circuit performs, for example, signal processing including at least one of phase adjustment, amplitude adjustment, and filtering on the electromagnetic wave for power supply generated by the signal source. The signal processing circuit may include an amplifier for the amplitude adjustment (power amplification).

The antenna emits the electromagnetic wave for power supply output from the signal processing circuit, as a power transmission beam into space. A lamp serving as the alarm device may be attached around the antenna. By way of example, turning on the lamp allows surrounding people to perceive that the wireless power transmission is being performed.

As shown in FIG. 3, the power transmitter 15 includes a plurality of antennas 151. The antenna 151 may be a planar antenna as shown in FIG. 3 or a linear antenna. The antennas 151 may be arranged in an array as shown in FIG. 3 or may be arranged in a different manner.

The plurality of antennas 151 form a power transmission face. The power transmission face corresponds to a portion of the power transmitter 15 that takes charge of emitting the power transmission beam. The power transmission face depends on the configuration of the power transmitter 15 (e.g., the size, shape, arrangement, and number of the antennas 151). By way of example, as shown in FIG. 3, a rectangular power transmission face TS including all the antennas 151 provided for the power transmitter 15 may be defined.

(1-2) Configuration of Power Reception Apparatus

A configuration of the power reception apparatus 30 will be described. FIG. 4 is a block diagram illustrating a configuration of the power reception apparatus. FIG. 5 is a diagram illustrating a power reception face corresponding to the power receiver of FIG. 4. FIG. 6 is a diagram illustrating a circuit configuration of a power reception module provided for the power receiver of FIG. 4. FIG. 7 is a graph illustrating the relationship between a reception power of the power reception module of FIG. 6 and a reference voltage detected by the power reception module.

As shown in FIG. 4, the power reception apparatus 30 includes a storage device 31, a processor 32, an input/output interface 33, a communication interface 34, and a power receiver 35. The power reception apparatus 30 is connectible to at least one of an input device 36 and an output device 37.

The storage device 31 is configured to store a program and data. The storage device 31 is, for example, a combination of ROM, RAM, and a storage (e.g., a flash memory or a hard disk).

The program includes, for example, the following program:
An OS program; and
An application program that executes information processing.

The data includes, for example, the following data:
A database referred to in the information processing; and
A result of executing the information processing.

The processor 32 is configured to realize a function of the power reception apparatus 30 (in particular, a function of controlling the power receiver 35) by activating the program stored in the storage device 31. The processor 32 is an example of a computer or a controller.

The input/output interface 33 is configured to acquire a signal (e.g., a user's instruction, sensing data, or a combination thereof) from the input device 36 connected to the power reception apparatus 30. The input/output interface 33 is also configured to output the signal to an output device connected to the power reception apparatus 30.

The input device 36 is, for example, a keyboard, a pointing device, a touch screen, a sensor (e.g., an orientation sensor), or a combination thereof.

The orientation sensor may include, for example, at least one of the following:
An acceleration sensor;
An angular velocity sensor; and
A magnetic sensor.

The output device 37 is, for example, a display.

The communication interface 34 is configured to control communications between the power reception apparatus 30 and an external device (e.g., the power transmission apparatus 10). By way of example, the communication interface 34 transmits sensing data to the external device.

By way of example, the communication interface 34 is a wireless communication module that supports at least one scheme of Bluetooth, ZigBee, specific low-power wireless communication, or wireless LAN.

The power receiver 35 is configured to receive the power transmission beam emitted into space by the power transmitter 15 to obtain power.

Specifically, the power receiver 35 includes an antenna and a power converter.

The antenna receives an electromagnetic wave for power supply (a power transmission beam) that propagates through the space.

The power converter converts the electromagnetic wave for power supply received by the antenna into (direct current) power.

When the electromagnetic wave for power supply is a microwave, the antenna and the power converter may be a rectenna (an example of the "power reception module"). When the electromagnetic wave for power supply is a lightwave, the antenna and the power converter may be an optoelectronic transducer (an example of the "power reception module").

As shown in FIG. 5, the power receiver 35 includes a plurality of antennas 351. The antenna 351 may be a planar antenna as shown in FIG. 5 or a linear antenna. The antennas 351 may be arranged in an array as shown in FIG. 5 or may be arranged in a different manner.

The plurality of antennas 351 form a power reception face (which may be also referred to as an aperture face). The power reception face corresponds to a portion of the power receiver 35 that takes charge of receiving the power transmission beam. The power reception face depends on the configuration of the power receiver 35 (e.g., the size, shape, arrangement, and number of the antennas 351). By way of example, as shown in FIG. 5, a rectangular power reception face RS including all the antennas 351 provided for the power receiver 35 may be defined. The power reception face may be an effective aperture face based on radio wave characteristics of the power receiver 35.

As shown in FIG. 6, the power reception module included in the power receiver 35 includes an antenna 351, a diode D, a capacitor C, a switch SW, and a resistor R.

The diode D has an anode grounded and a cathode connected to the antenna 351, a first terminal of the capacitor, and an input terminal of the switch SW. The capacitor C has the first terminal connected to the antenna 351, the cathode of the diode D, and the input terminal of the switch SW, and a second terminal grounded. The diode D and the capacitor C convert (i.e., rectify), into a direct current, the alternating current output from the antenna 351 receiving the power transmission beam.

The switch SW includes one input terminal and two output terminals. The input terminal of the switch SW is connected to the antenna 351, the cathode of the diode D, and the first terminal of the capacitor C. The first output terminal of the switch SW is connected to a node NO. The second output terminal of the switch SW is connected to a node N1 and one end of the resistor R.

In response to a control signal (not shown), the switch SW short-circuits between the input terminal and either the first output terminal or the second output terminal.

Specifically, at the time of wireless power supply (i.e., when a power transmission beam for which a power for power supply is set is being emitted), the switch SW short-circuits between the input terminal and the first output terminal (first switch state). Thus, the direct current obtained by the diode D and the capacitor C is led to a battery (not shown) through the node NO. Any circuit configuration may or may not exist between the node NO and the battery.

In detection, the switch SW short-circuits between the input terminal and the second output terminal (second switch state). Thus, the direct current obtained by the diode D and the capacitor C is led to the resistor R.

The resistor R has one end connected to the node N1 and the second output terminal of the switch SW, and the other end connected to the node N2 (ground). A direct current flows through the switch SW to the resistor R when the switch SW is in the second switch state. Thus, a reference voltage Vref is generated between both ends of the resistor R (i.e., between the nodes N1 and N2). As shown in FIG. 7, the reference voltage Vref depends on a reception power Prf of the power reception module. Therefore, by identifying the reception power Prf corresponding to the detected reference voltage Vref, an estimated value of the reception power Prf can be derived.

The power reception apparatus 30 includes a battery (not shown). The battery supplies power to each unit of the power reception apparatus 30. The battery is charged by the power obtained by the power receiver 35.

(2) Database

A database of the present embodiment will be described. The following database is stored in at least one of the storage device 11 and the storage device 31.

(2-1) Power Reception Class Database

A power reception class database of the present embodiment will be described. FIG. 8 is a diagram showing a data structure of the power reception class database of the present embodiment. The power reception class database is stored in at least one of the storage device 11 and the storage device 31.

As shown in FIG. 8, the power reception class database includes a "class" field, an "input power range" field, an "output power range" field, a "frequency" field, and an "antenna configuration" field. The fields are associated with each other.

The power reception class database holds power reception class information (an example of "information on power receiving capability"). The power reception class information is information on the power reception class. The power reception class is a concept in which power receiving capabilities that power receivers of various power reception apparatuses can have are categorized.

The power receiving capability includes, for example, at least one of the following:

A size of the power reception face;

A shape of the power reception face;

A power range in which the power receiver 35 can receive power;

A frequency that the power receiver 35 can receive; and

A type of polarized electromagnetic radiation that the power receiver 35 can receive.

The "class" field holds class information. The class information is information for identifying a class.

The storage device 31 of the power reception apparatus 30 holds class information indicating a power reception class to which the power receiving capability of the power receiver 35 provided for the power reception apparatus 30 belongs.

The "input power range" field holds input power range information. The input power range information is information for defining an input power range (e.g., a minimum value and a maximum value). The input power range is, for example, a recommended input power range of the power reception module provided for the power receiver 35. The input power range can be determined with reference to the efficiency characteristics of the power reception module (e.g., the correspondence between the input power and the efficiency). In this case, the input power range means a range of the reception power in which the power reception module can operate safely and efficiently.

The "output power range" field holds output power range information. The output power range information is information that defines an output power range (e.g., a minimum value and a maximum value). The output power range is a range of the output power of the power reception module when a reception voltage within the input power range is applied.

The "frequency" field holds frequency information. The frequency information is information on the frequency of the electromagnetic wave for power supply that the power receiver 35 can receive.

The "antenna configuration" field holds antenna configuration information. The antenna configuration information is information on the configuration of the antenna 351 provided for the power receiver 35.

By way of example, the "antenna configuration" field includes an "interval" field, an "element number" field, and an "arrangement" field.

The "interval" field holds antenna interval information. The antenna interval information is information on the interval between adjacent antennas 351 provided for the power receiver 35.

The "element number" field holds antenna element number information. The antenna element number information is information on the number of antennas 351 provided for the power receiver 35.

The "arrangement" field holds antenna arrangement information. The antenna arrangement information is information on the overall arrangement of the plurality of antennas 351 provided for the power receiver 35.

(2-2) Reception Power Database

A reception power database of the present embodiment will be described. The reception power database is stored in at least one of the storage device 11 and the storage device 31.

As described above, in the power reception module provided for the power reception apparatus 30, there is correspondence between the reference voltage Vref and the reception power Prf. In order to identify the reception power Prf corresponding to the reference voltage Vref, the reception power database (not shown) describing such correspondence can be used. By searching the reception power database using the value of the reference voltage Vref as a key, the value of the corresponding reception power Prf can be identified.

(3) Wireless Power Supply Process

A wireless power supply process of the present embodiment will be described. FIG. 9 is a diagram showing an overall flow of a wireless power supply process of the present embodiment. FIG. 10 is an illustration regarding a determination of power for power supply. FIG. 11 is an illustration regarding a determination of power for power supply. FIG. 12 is an illustration regarding a determination of power for power supply.

As shown in FIG. 9, the power transmission apparatus 10 executes an emission of a test beam (S110).

Specifically, the processor 12 causes the power transmitter 15 to emit the test beam toward the power reception apparatus 30.

As described above, the power set for the test beam is weaker than the power for power supply. This suppresses the reception power of the test beam in the power reception apparatus 30, and it is thus possible to avoid a malfunction caused by the reception power exceeding the power receiving capability (e.g., the maximum value of the input power range) of the power reception apparatus 30.

By way of example, the processor 12 may set the minimum value in a settable power range (e.g., power when the gain of a power amplifier (not shown) is set to 0 [dB]) for the test beam. Further, the processor 12 may make the power set for the test beam variable according to power supply conditions (e.g., the position or orientation of the power reception apparatus 30 or the presence or absence of an obstacle).

After step S110, the power reception apparatus 30 executes detection of the reference voltage (S130).

Specifically, the power reception module (FIG. 6) provided for the power receiver 35 receives the test beam emitted in step S110. In receiving the test beam, the power reception module has the switch SW set in the second switch state. Therefore, the power reception module has the reference voltage Vref generated between the node N1 and the node N2. The processor 32 reads the value of the generated reference voltage Vref.

After step S130, the power reception apparatus 30 executes transmission of feedback information (S131).

Specifically, the processor 32 transmits feedback information on the reception result on the test beam in the power receiver 35 and on the power receiving capability of the power receiver 35 to the power transmission apparatus 10 via the communication interface 34.

By way of example, the processor 32 transmits feedback information including information indicating the reference voltage Vref detected in step S130 (an example of "information on a reception result") to the power transmission apparatus 10.

When the power reception apparatus 30 includes a plurality of power reception modules, a reference voltage is detected for each power reception module. The processor 32 may transmit feedback information including information indicating all values detected by the plurality of power reception modules to the power transmission apparatus 10, or may transmit feedback information including information indicating part of the detected values (e.g., only a maximum value or only a minimum value and a maximum value) to the power transmission apparatus 10.

In step S131, the processor 32 may further transmit feedback information including information on the power receiving capability of the power reception apparatus 30 (e.g., the class information or the input power range information) to the power transmission apparatus 10.

Note that the power reception apparatus 30 can also transmit the information on the power receiving capability to the power transmission apparatus 10 at a timing different from that in step S131. By way of example, the power reception apparatus 30 may transmit the information on the power receiving capability to the power transmission apparatus 10 prior to the start of the wireless power supply process shown in FIG. 9. In this case, the information on the power receiving capability may be included in the power supply request.

After step S131, the power transmission apparatus 10 executes the derivation of the estimated reception power (S111).

Specifically, the processor 12 identifies, with reference to the feedback information transmitted in step S131, a value of the reference voltage detected in step S130. The processor 12 identifies, with reference to the reception power database, a value of the reception power corresponding to the value of the reference voltage. Thus, the processor 12 derives the estimated reception power (i.e., an estimated value for Prf) corresponding to the reference voltage.

When the feedback information transmitted in step S131 includes information indicating a reference voltage in the plurality of power reception modules, the processor 12 may individually derive estimated reception powers for all reference voltages or may individually derive an estimated reception power for a part of the reference voltages (e.g., only a maximum value or only a minimum value and a maximum value).

After step S111, the power transmission apparatus 10 executes a determination of the power for power supply (S112).

Specifically, the processor 12 determines the power for power supply with reference to the estimated reception power derived in step S111 and the information on the power receiving capability of the power reception apparatus 30.

By way of example, the processor 12 identifies, with reference to the information on the power receiving capability, a maximum value Pmax and a minimum value Pmin of the input power range of the power reception apparatus 30. The processor 12 calculates power ratios (Pmax/Pest and Pmin/Pest) of the maximum value Pmax and the minimum value Pmin to the estimated reception power (Pest), respectively.

The processor 12 compares the power ratio range (from Pmax/Pest to Pmin/Pest) with the settable gain range (from Gmax to Gmin). The gain herein represents the power ratio of the power for power supply to the power set for the test beam. That is, if a power amplifier has a gain of 0 [dB] at the time of the test beam emission, the gain range corresponds to a dynamic range of the power amplifier. Gmax represents the maximum value of the gain. Gmin represents the minimum value of the gain. That is, when the power set for the test beam is Pt, the minimum value of the power for power supply is Gmin×Pt, and the maximum value of the power for power supply is Gmax×Pt.

As shown in FIG. 10, when there is an overlapping range (hereinafter referred to as a "recommended power-supply range") between the power ratio range (from Pmax/Pest to Pmin/Pest) and the gain range (from Gmax to Gmin), that is, when Pmax/Pest≥Gmax≥Pmin/Pest or Pmax/Pest≥Gmin≥Pmin/Pest is satisfied, the processor 12 determines one gain (Gopt) from the recommended power-supply range. Thus, the power for power supply is determined as Gopt×Pt. When the power transmitter 15 emits a power transmission beam for which such a power for power supply is set, the reception power in the power reception apparatus 30 is expected to fall within the input power range of the power reception apparatus 30, and highly efficient power transmission is thus possible. In particular, since the reception power in the power reception apparatus 30 is expected not to exceed the maximum value of the input power range of the power reception apparatus 30, the power reception apparatus 30 can operate safely.

By way of example, Gopt may be set to a maximum gain within the recommended power-supply range, or may be set to a gain obtained by multiplying the maximum gain and a predetermined ratio (e.g., 0.9) together.

After step S112, the processor 12 may perform at least one of the following processes:
Report, to the power reception apparatus 30 or a user, that power supply to the power reception apparatus 30 is practicable;
Wait for a power supply start request from the power reception apparatus 30;
Emit the transmission beam for which the power for power supply determined in step S112 is set, toward the power reception apparatus 30 (i.e., start the power supply); and
Notify a user or the power reception apparatus 30 that the efficiency of the power supply to the power reception apparatus 30 is high.

On the other hand, because of the distance between the power transmission apparatus 10 and the power reception apparatus 30 or another factor, there may not be a recommended power-supply range. In this case, the power transmission apparatus 10 may perform error handling as exemplified below.

As shown in FIG. 11, when Gmin>Pmax/Pest is satisfied, the power for power supply, even if minimized, will exceed the maximum value Pmax of the input power range, and it is thus difficult to transmit power to the power reception apparatus 30 safely and highly efficiently.

Accordingly, the processor 12 may perform at least one of the following processes:
Provide notification to prompt a user, the power reception apparatus 30, or a movable mechanism of the power reception apparatus 30 to move the power reception apparatus 30 away from the power transmission apparatus 10;
Report to the power reception apparatus 30 or a user that power cannot be supplied to the power reception apparatus 30;
Provide notification to prompt a user, the power reception apparatus 30, or a movable mechanism (e.g., a robot arm) of the power reception apparatus 30 so that the power reception face of the power reception apparatus 30 will not be parallel to the power transmission face of the power transmission apparatus 10; and
Shape the transmission beam so as to spread out more widely.

As shown in FIG. 12, when Pmin/Pest>Gmax is satisfied, the power for power supply, even if maximized, will fall short of the minimum value Pmin in the input power range, and it is thus difficult to transmit power to the power reception apparatus 30 highly efficiently.

Accordingly, the processor 12 may perform any of the following processes:
Provide notification to prompt a user, the power reception apparatus 30, or a movable mechanism of the power reception apparatus 30 to bring the power reception apparatus 30 closer to the power transmission apparatus 10;
Cause a display of the power reception apparatus 30 to display information on a power-suppliable area such as a map image;
Report, to the power reception apparatus 30 or a user, that power supply to the power reception apparatus 30 is impracticable;
Provide notification to prompt a user, the power reception apparatus 30, or a movable mechanism of the power reception apparatus 30 so that the power reception face of the power reception apparatus 30 will be parallel to the power transmission face of the power transmission apparatus 10;
Notify a user or the power reception apparatus 30 that the efficiency of the power supply to the power reception apparatus 30 is low.

As described above, the power transmission apparatus according to the present embodiment emits the test beam for which a power feebler than the power for power supply is set, and receives the feedback information on the reception result on the test beam in the power reception apparatus and on the power receiving capability of the power reception apparatus. Then, the power transmission apparatus determines the power for power supply with reference to the feedback information. Therefore, according to this power transmission apparatus, it is possible to realize highly efficient power transmission with the power set for the transmission beam controlled not to exceed the power receiving capability of the power reception apparatus after the start of the wireless power supply.

(4) Modifications

Modifications of the present embodiment will be described.

(4-1) Modification 1

Modification 1 will be described. Modification 1 is an example in which the power reception apparatus 30 derives an estimated reception power of the power receiver 35 and transmits feedback information including information on the estimated reception power.

A wireless power supply process of Modification 1 will be described. FIG. 13 is a diagram showing an overall flow of a wireless power supply process of Modification 1.

As shown in FIG. 13, the power transmission apparatus 10 executes an emission of a test beam (S110) in the same manner as in FIG. 9.

After step S110, the power reception apparatus 30 executes detection of the reference voltage (S130) in the same manner as in FIG. 9.

After step S130, the power reception apparatus 30 executes the derivation of the estimated reception power (S132).

Specifically, the processor 32 identifies, with reference to the reference voltage detected in step S130 and the reception power database, a value of the reception power corresponding to the value of the reference voltage detected in step S130. Thus, the processor 32 derives the estimated reception power corresponding to the reference voltage.

Note that when the power reception apparatus 30 includes a plurality of power reception modules, a reference voltage is detected for each power reception module. The processor 32 may individually derive estimated reception powers for all reference voltages or may individually derive an estimated reception power for a part of the reference voltages (e.g., only a maximum value or only a minimum value and a maximum value).

After step S132, the power reception apparatus 30 executes transmission of feedback information (S131a).

Specifically, the processor 32 transmits feedback information on the reception result on the test beam in the power receiver 35 and on the power receiving capability of the power receiver 35 to the power transmission apparatus 10 via the communication interface 34.

By way of example, the processor 32 transmits feedback information including information (an example of "information on a reception result") indicating the estimated reception power derived in step S132 to the power transmission apparatus 10.

When the estimated reception power is individually derived for the plurality of power reception modules in step S132, the processor 32 may transmit feedback information including information indicating all the estimated reception powers of these power reception modules to the power transmission apparatus 10, or may transmit feedback information including information indicating part of the estimated reception powers of these power reception modules (e.g., only a maximum value or only a minimum value and a maximum value) to the power transmission apparatus 10.

In step S131a, the processor 32 may further transmit feedback information including information on the power receiving capability of the power reception apparatus 30 (e.g., the class information or the input power range information) to the power transmission apparatus 10.

Note that the power reception apparatus 30 can also transmit the information on the power receiving capability to the power transmission apparatus 10 at a timing different from that in step S131a. By way of example, the power reception apparatus 30 may transmit the information on the power receiving capability to the power transmission apparatus 10 prior to the start of the wireless power supply process shown in FIG. 13. In this case, the information on the power receiving capability may be included in the power supply request.

After step S131a, the power transmission apparatus 10 executes a determination of the power for power supply (S112a).

Specifically, the processor 12 identifies, with reference to the feedback information transmitted in step S131a, a value of the estimated reception power derived in step S132. Then, the processor 12 determines the power for power supply with reference to the estimated reception power and the information on the power receiving capability of the power reception apparatus 30. Other contents regarding step S112a have already been described with respect to step S112 in the present embodiment (see FIGS. 9 to 12).

As described above, the power transmission apparatus according to Modification 1 emits the test beam for which a power feebler than the power for power supply is set, and receives the feedback information on the reception result on the test beam in the power reception apparatus and on the power receiving capability of the power reception apparatus. Then, the power transmission apparatus determines the power for power supply with reference to the feedback information. Therefore, according to this power transmission apparatus, it is possible to realize highly efficient power transmission with the power set for the transmission beam controlled not to exceed the power receiving capability of the power reception apparatus after the start of the wireless power supply.

(4-2) Modification 2

Modification 2 will be described. Modification 2 is an example in which the power reception apparatus 30 calculates the above-described power ratio range (from Pmax/Pest to Pmin/Pest) and transmits the feedback information including the information on the power ratio.

A wireless power supply process of Modification 2 will be described. FIG. 14 is a diagram showing an overall flow of a wireless power supply process of Modification 2.

As shown in FIG. 14, the power transmission apparatus 10 executes an emission of a test beam (S110) in the same manner as in FIG. 9.

After step S110, the power reception apparatus 30 executes detection of the reference voltage (S130) in the same manner as in FIG. 9.

After step S130, the power reception apparatus 30 executes the derivation of the estimated reception power (S132) in the same manner as in FIG. 13.

After step S132, the power reception apparatus 30 executes calculation of the power ratio (S133).

Specifically, the processor 32 identifies, with reference to the information on the power receiving capability, a maximum value Pmax and a minimum value Pmin of the input power range of the power reception apparatus 30. The processor 32 calculates power ratios (Pmax/Pest and Pmin/Pest) of the maximum value Pmax and the minimum value Pmin to the estimated reception power (Pest) derived in step S132, respectively.

When the processor 32 individually derives the estimated reception powers for the plurality of power reception modules in step S132, the processor 32 may individually derive the power ratios for all of these estimated reception powers.

When the estimated reception power is individually derived for the plurality of power reception modules in step S132, the processor 32 may calculate power ratios for all the estimated reception powers of these power reception modules, or may calculate a power ratio for part of the estimated reception powers (e.g., only a maximum value or only a minimum value and a maximum value) of these power reception modules.

After step S133, the power reception apparatus 30 executes transmission of feedback information (S131b).

Specifically, the processor 32 transmits feedback information on the reception result on the test beam in the power receiver 35 and on the power receiving capability of the power receiver 35 to the power transmission apparatus 10 via the communication interface 34.

By way of example, the processor 32 transmits the feedback information including the information indicating the power ratio derived in step S133 to the power transmission apparatus 10.

When the power ratio is individually derived for the plurality of power reception modules in step S133, the processor 32 may transmit feedback information including information indicating all power ratios of these power reception modules to the power transmission apparatus 10, or may transmit feedback information including information indicating part of the power ratios of these power reception modules (e.g., only a maximum value or only a minimum value and a maximum value) to the power transmission apparatus 10.

After step S131b, the power transmission apparatus 10 executes a determination of the power for power supply (S112b).

Specifically, the processor 12 identifies, with reference to the feedback information transmitted in step S131b, a value of the power ratio derived in step S133. Then, the processor 12 determines the power for power supply with reference to the power ratio. Other contents regarding step S112b have already been described with respect to step S112 in the present embodiment (see FIGS. 9 to 12).

As described above, the power transmission apparatus according to Modification 2 emits the test beam for which a power feebler than the power for power supply is set, and receives the feedback information on the reception result on the test beam in the power reception apparatus and on the power receiving capability of the power reception apparatus. Then, the power transmission apparatus determines the power for power supply with reference to the feedback information. Therefore, according to this power transmission apparatus, it is possible to realize highly efficient power transmission with the power set for the transmission beam controlled not to exceed the power receiving capability of the power reception apparatus after the start of the wireless power supply.

(4-3) Modification 3

Modification 3 is an example in which when the power receiver 35 includes a plurality of power reception modules, some of the power reception modules have no circuit configuration for realizing a detection function (i.e., a circuit configuration for detecting a reference voltage). FIG. 15 is a diagram illustrating a circuit configuration of a power reception module without a detecting function.

As shown in FIG. 15, the power reception module included in the power receiver 35 includes an antenna 351, a diode D, and a capacitor C.

The diode D has an anode grounded and a cathode connected to the antenna 351, a first terminal of the capacitor, and a node N0. The capacitor C has the first terminal connected to the antenna 351, the cathode of the diode D, and the node N0, and a second terminal grounded. The diode D and the capacitor C convert (i.e., rectify), into a direct current, the alternating current output from the antenna 351 receiving the power transmission beam. The direct current obtained by the diode D and the capacitor C is led to a battery (not shown) through the node N0. Any circuit configuration may or may not exist between the node N0 and the battery.

Any part of the plurality of power reception modules provided for the power receiver 35 may be replaced by a power reception module as shown in FIG. 15. However, as described below, in order to monitor the reception power at a specific position, it is preferable that the power reception module arranged near the specific position have a circuit configuration for realizing a detection function.

For example, the transmission beam may be shaped so as to have its power level highest near the center of the reception face. In this case, the power reception module including the antenna 351 placed near the center of the power reception face is more likely to have the reception power exceeding the power receiving capability than the other power reception modules. Therefore, it is preferable that such a power reception module have a circuit configuration for realizing a detection function.

The transmission beam may be shaped to fit an edge (i.e., a side or a vertex) of the power reception face at the position of the power reception apparatus 30. In this case, the reception power in the power reception module including the antenna 351 placed near the edge of the power reception face can be used to detect that the power transmission beam is not formed into an ideal shape (e.g., rotationally misaligned or undersized). Therefore, it is preferable that such a power reception module have a circuit configuration for realizing a detection function.

As described above, according to the power reception apparatus according to Modification 3, the similar effect as that of these power reception apparatuses of the present embodiment or Modifications 1 and 2 can be obtained while simplifying the configuration of a part of the power reception modules as compared with the power reception apparatus of the present embodiment or Modifications 1 and 2.

(4-4) Modification 4

Modification 4 is an example in which the power transmission apparatus 10 shapes the power transmission beam with reference to static information and dynamic information of the power receiver prior to the emission of the test beam (S110). That is, according to Modification 4, the power transmission apparatus 10 emits a shaped test beam.

(4-4-1) Outline of Embodiment

An outline of Modification 4 will be described. FIG. 17 is an illustration of the outline of Modification 4.

The power transmission apparatus 10 of Modification 4 identifies not only the position and orientation of the power reception face corresponding to the power receiver 35 provided for the power reception apparatus 30 but also the size and shape of the power reception face. Then, the power transmission apparatus 10 shapes the power transmission beam such that the power transmission beam is focused on a spot suitable for the orientation, size, and shape of the power reception face at the position of the power reception face, and then emits the power transmission beam. By way of example, the power transmission apparatus 10 causes the plurality of antennas 151 to emit RF beams with different phases and different amplitudes.

In short, as shown in FIG. 17, the power transmission apparatus 10 collects power transmission beams PTB on a power reception face RS, thereby preventing leakage of electromagnetic waves to the outside of the power reception face RS. Accordingly, it is possible to suppress an adverse effect on a living body or a device due to the leakage of electromagnetic waves around the power reception apparatus 30. Since the power transmission beam PTB reaches, for example, the entire area of the power reception face RS, it is possible to exploit the overall power reception performance of the plurality of antennas 351 provided for the power receiver 35. That is, it is possible to increase the amount of power that can be received per unit time and realize highly efficient power transmission.

(4-4-2) Power Transmission Control Process

The power transmission control process of Modification 4 will be described. FIG. 18 is a flowchart illustrating a power transmission control process of Modification 4. FIG. 19 is a flowchart illustrating details of step S210 of FIG. 18. FIG. 20 is a diagram illustrating a structure of information that a power transmission apparatus receives from a power reception apparatus. FIG. 21 is a flowchart illustrating details of step S220 of FIG. 18. FIG. 22 is a diagram illustrating an ideal beam shape. FIG. 23 is a diagram illustrating an ideal beam shape.

The power transmission control process of FIG. 18 starts, for example, in response to the processor 12 acquiring the power supply request received from the power reception apparatus 30 through the communication interface 14.

As shown in FIG. 18, the power transmission apparatus 10 executes identification of static information on the power reception face (S210).

Specifically, the processor 12 identifies the static information on the power reception face.

The static information on the power reception face is information of the attribute or state of the power reception face that is assumed to be unlikely to change from the start to the end of the wireless power supply. By way of example, the static information is the size of the power reception face and the shape of the power reception face.

The size of the power reception face represents the actual size of the power reception face. For example, the size of the power reception face may include at least one of the following:

A length of a part or the whole of a contour line defining the power reception face (e.g., a length of a side of the power reception face, or a total length of the power reception face);

A length between two points on the contour line defining the power reception face (e.g., a length of a diagonal line of the power reception face, a radius of the power reception face, a length of a major axis of the power reception face, or a length of a minor axis of the power reception face);

An area surrounded by the contour line defining the power reception face.

The shape of the power reception face indicates the geometric shape of the power reception face. The shape of the power reception face is, for example, a combination of any curves (e.g., a circle or an ellipse), a combination of any straight lines (e.g., a polygon), or a combination of any curve and straight line (e.g., a sector).

By way of example, the identification of the static information on the power reception face (S210) is performed in line with FIG. 19.

As shown in FIG. 19, the power transmission apparatus 10 executes identification of a size (S211).

Specifically, the processor 12 identifies, with reference to the information received from the power reception apparatus 30, the size of the power reception face.

By way of example, the communication interface 14 of the power transmission apparatus 10 receives information having the structure shown in FIG. 20 from the power reception apparatus 30. Part or all of this information may be included in the power supply request that for example, the power reception apparatus 30 transmits to the power transmission apparatus 10.

As shown in FIG. 20, the information received from the power reception apparatus 30 can include not only a power receiver ID but also size information, shape information, and orientation information.

The power receiver ID is information for identifying the power receiver 35 provided for the power reception apparatus 30 that is a transmission source. The power receiver ID is stored in the storage device 31 of the power reception apparatus 30, for example.

The size information is information on the size of the power reception face corresponding to the power receiver 35 identified by the power receiver ID. The size information is stored in the storage device 31 of the power reception apparatus 30, for example.

The shape information is information on the shape of the power reception face corresponding to the power receiver 35 identified by the power receiver ID. The shape information is stored in the storage device 31 of the power reception apparatus 30, for example.

The orientation information is information on the orientation of the power reception face corresponding to the power receiver 35 identified by the power receiver ID. By way of example, the orientation information is generated by the processor 32 of the power reception apparatus 30 in accordance with the sensing result of the orientation sensor (an example of the input device 36). As another example, the orientation information can be generated by using a difference in reception phase between the power reception antenna elements with respect to an incoming signal.

The processor 12 extracts information on the size of the power reception face from the information received from the power reception apparatus 30. The processor 12 refers to the extracted information, thereby identifying the size of the power reception face.

As shown in FIG. 19, the power transmission apparatus 10 executes identification of a shape (S212).

Specifically, the processor 12 identifies the shape of the power reception face with reference to the information received from the power reception apparatus 30.

By way of example, the processor 12 extracts information on the shape of the power reception face from the information received from the power reception apparatus 30 (FIG. 20). The processor 12 refers to the extracted information, thereby identifying the shape of the power reception face.

Step S212 may be executed after step S211 as shown in FIG. 19, or may be executed before step S211 or concurrently with step S211.

As shown in FIG. 18, the power transmission apparatus 10 executes identification of dynamic information on the power reception face (S220).

Specifically, the processor 12 identifies dynamic information on the power reception face.

Step S220 may be executed after step S210 as shown in FIG. 18, or may be executed before step S210 or concurrently with step S210.

The dynamic information on the power reception face is information of the attribute or state of the power reception face that is assumed to be likely to change from the start to the end of the wireless power supply. By way of example, the dynamic information is the position of the power reception face and the orientation of the power reception face. When the power reception apparatus 30 moves or rotates during the period from the start to the end of the wireless power supply, at least one of the position of the power reception face and the orientation of the power reception face changes.

The position of the power reception face represents the relative position of the power reception face with respect to the power transmission face. For example, the position of the power reception face may include at least one of the following:

Coordinates of one or more reference points (e.g., vertices) on the contour line defining the power reception face; and Coordinates of one or more reference points (e.g., at least one of a center point and a center of gravity) located inside the power reception face.

The orientation of the power reception face represents the relative direction of the power reception face with respect to a reference plane (e.g., a horizontal plane or the power transmission face). By way of example, the orientation of the power reception face is an inclination (e.g., at least one of a roll angle, a pitch angle, and a yaw angle of the power reception face) of the power reception face with respect to the reference plane.

By way of example, the identification of the dynamic information on the power reception face (S220) is performed in line with FIG. 21.

As shown in FIG. 21, the power transmission apparatus 10 executes identification of a position (S221).

Specifically, the processor 12 identifies the position of the power reception face. The position of the power reception face can be identified by various techniques. The processor 12 preferably identifies the position of the power reception face without wireless power transmission. This eliminates the necessity to emit a transmission beam in order to identify the position of the power reception face, and thus, an adverse effect on a surrounding living body and device will not occur in identifying of the position of the power reception face.

In Modification 4, the processor 12 identifies the position of the power reception face with reference to the sensing result of the optical sensor (an example of the input device 16).

By way of example, the processor 12 refers to an image of the power reception apparatus 30 captured by a camera, and measures a distance from the camera to a target part. The processor 12 can identify the position of the power reception face on the basis of the measured distance and a known parameter (e.g., the positional relationship between the camera and the power transmission face, a photographing condition (e.g., an angle of view and an angle) of the camera, and the positional relationship between the target part and the power reception face (e.g., the center point of the power reception face)). Note that the processor 12 may identify the position of the power reception face with reference to a measurement result of a distance measurement sensor (e.g., an ultrasonic sensor, Lidar, etc.).

The target part is a feature that can be observed from the outside of the power reception apparatus 30. The target part may include, for example, at least one of the following:

A part of the power reception apparatus 30 or a cover covering the power reception apparatus 30 to which a mark (e.g., at least one of a two dimensional bar code, a specific uneven spot, a specific pattern, a specific color, and a specific shape) is applied;

At least one vertex, corner, side, or the whole of the antenna 351; and

A vertex, corner, side, or the whole of the power receiver 35.

As shown in FIG. 21, the power transmission apparatus 10 executes identification of an orientation (S222).

Specifically, the processor 12 identifies the orientation of the power reception face with reference to the information received from the power reception apparatus 30.

By way of example, the processor 12 extracts information on the orientation of the power reception face from the information received from the power reception apparatus 30 (FIG. 20). The processor 12 refers to the extracted information, thereby identifying the orientation of the power reception face.

Step S222 may be executed after step S221 as shown in FIG. 21, or may be executed before step S221 or concurrently with step S221.

After step S210 and step S220, the power transmission apparatus 10 executes generation of a control parameter (S230).

Specifically, the processor 12 generates, with reference to the static information of the power reception face identified in step S210 and the dynamic information of the power reception face identified in step S220, a control parameter (e.g., a beam excitation condition) related to beam formation.

By way of example, the processor 12 generates the control parameter such that the power transmission beam emitted from the power transmitter 15 is focused on a spot suitable for the size of the power reception face, the shape of the power reception face, and the orientation of the power reception face at the position of the power reception face.

This allows the power transmission beam to be concentrated across substantially the entire area of the power reception face, which in turn can exploit the power receiving performance of most of the antennas 351 provided for the power receiver 35 (that is, can realize highly efficient wireless power transmission) as well as suppress the leakage of electromagnetic waves around the power receiver 35.

As shown in FIG. 22, a first example control parameter is determined so that the intensity of the power transmission beam will be half (i.e., a half-value) of the maximum value at at least part of the edge (i.e., side or vertex) of the power reception face. This allows efficient power transmission while suppressing variations in reception power between the antennas 351.

As shown in FIG. 23, a second example control parameter is determined so that the intensity of the power transmission beam will be null (i.e. 0 value) at at least part of the edge of the power reception face. This can further enhance the efficiency of the power transmission.

After step S230, the power transmission apparatus 10 executes wireless power transmission (step S240).

Specifically, the processor 12 causes the transmitter 15 to emit a power transmission beam in accordance with the control parameter generated in step S230.

In step S240, the power transmission apparatus 10 and the power reception apparatus 30 perform the wireless power supply process shown in FIG. 9, FIG. 13, or FIG. 14.

After step S240, the power transmission apparatus 10 executes a power transmission end determination (S250).

Specifically, the processor 12 determines whether the power transmission has ended. For example, the processor 12 may determine that the power transmission has ended, when at least one of the following conditions is satisfied:

The capacity of the battery of the power reception apparatus 30 has reached a threshold value (e.g., full charge) (e.g., information received from the power reception apparatus 30 is referred to);

The power reception apparatus 30 cannot be detected (e.g., the wireless connection with the power reception apparatus 30 has been disconnected);

A power transmission end request has been received from the power reception apparatus 30;

A vibration of the power reception apparatus 30 has been detected (the power reception apparatus 30 can transmit a vibration detection signal when a vibration of the power reception apparatus 30 is detected by a vibration sensor provided for the power reception apparatus 30);

A human sensor connected to the power transmission apparatus 10 has detected a person;

A power transmission end signal has been received (e.g., from a remote controller not shown); and A predetermined time has elapsed since the start of wireless power transmission.

When it is determined in step S250 that the power transmission has ended, the power transmission apparatus 10 ends the power transmission control process.

When it is determined in step S250 that the power transmission has not ended, the power transmission apparatus 10 executes the wireless power transmission (S240) and the power transmission end determination (S250) again.

As described above, the power transmission apparatus of Modification 4 identifies not only the position and orientation of the power reception face corresponding to the power receiver provided for the power reception apparatus but also the size and shape of the power reception face. Then, the power transmission apparatus shapes the power transmission beam such that the power transmission beam is focused on a spot suitable for the orientation, size, and shape of the power reception face at the position of the power reception face, and then emits the power transmission beam. Thus, the power transmission apparatus collects power transmission beams on the power reception face and prevents the leakage of electromagnetic waves to the outside of the power reception face. Accordingly, it is possible to suppress an adverse effect on a living body or a device due to the leakage of electromagnetic waves around the power reception apparatus. Since the power transmission beam reaches, for example, the entire area of the power reception face, it is possible to exploit the overall power reception performance of the plurality of antennas provided for the power receiver. That is, it is possible to increase the amount of power that can be received per unit time and realize highly efficient power transmission.

(4-5-1) Modification 5

Modification 5 will be described. Modification 5 is an example in which the control parameter is updated in response to a change in dynamic information on the power reception face in Modification 4.

The power transmission control process of Modification 5 will be described. FIG. 24 is a flowchart illustrating a power transmission control process of Modification 5. FIG. 25 is an illustration of how a power transmission beam is controlled when the orientation of a power reception face changes.

As shown in FIG. 24, the power transmission apparatus 10 executes identification of static information on the power reception face (S210), identification of dynamic information on the power reception face (S220), generation of a control parameter (S230), wireless power transmission (S240), and power transmission end determination (S250) in the same manner as in FIG. 18.

When it is determined in step S250 that the power transmission has ended, the power transmission apparatus 10 ends the power transmission control process in the same manner as in FIG. 18.

When it is determined in step S250 that the power transmission has not ended, the power transmission apparatus 10 executes identification of dynamic information on the power reception face (S220), generation of a control parameter (S230), wireless power transmission (S240), and the power transmission end determination (S250) again, unlike in FIG. 18.

This allows the control parameter to be updated in response to a change in dynamic information on the power reception face. For example, when the orientation of the power reception face is changed by rotation, the change in the orientation of the power reception face can be tracked as shown in FIG. 25 by changing the rotation angle of the transmission beam PTB.

As described above, according to the power transmission apparatus of Modification 5, even if at least one of the position and orientation of the power reception face is changed, the power transmission beam can be shaped adaptively. That is, it is possible to realize highly efficient wireless power transmission while suppressing the leakage of electromagnetic waves in a manner robust with respect to the movement (travel or rotation) of the power reception apparatus.

(4-2) Modification 6

Modification 6 will be described. Modification 6 is an example in which static information on the power reception face is stored in advance in the storage device 11 of the power transmission apparatus 10 in Modification 4 or Modification 5.

In Modification 6, in step S210 of FIG. 18 or FIG. 24, the processor 12 refers to the power receiver database stored in the storage device 11, thereby identifying static information on the power reception face.

FIG. 26 is a diagram illustrating a data structure of a power receiver database of Modification 6. The power receiver database is stored in the storage device 11.

As shown in FIG. 26, the power receiver database includes a "power receiver ID" field, a "shape" field, and a "size" field. The fields are associated with each other.

In the power receiver database, static information on the power reception face corresponding to each power receiver 35 is registered.

The "power receiver ID" field holds the aforementioned power receiver ID.

The "shape" field holds the aforementioned shape information.

The "size" field holds the aforementioned size information.

For example, when the power transmission apparatus 10 performs wireless power transmission to the power receiver 35 for the first time or when the power receiver 35 is registered in the power transmission apparatus 10 as one of the targets for power supply, the processor 12 may resister, with reference to the information received from the power reception apparatus 30, static information on the power reception face corresponding to the power receiver 35 in the power receiver database, or a human may manually resister the static information on the power reception face corresponding to the power receiver 35 in the power receiver database.

Note that at least one of the shape information and the size information may be associated with model information instead of the power receiver ID. The model information is information on a model of at least one of the power reception apparatus 30 and the power receiver 35.

As described above, according to the power transmission apparatus of Modification 6, the static information on the power reception face is stored in advance in the storage device 11 of the power transmission apparatus 10. Therefore, even if the static information on the power reception face is not received from the power reception apparatus 30 in each wireless power transmission, it is possible to identify the static information on the power reception face and shape the power transmission beam. That is, even in a situation where it is difficult or impossible to receive information from the power reception apparatus 30, it is possible to realize highly efficient wireless power transmission while suppressing the leakage of electromagnetic waves.

(5) Other Modifications

The storage device 11 may be connected to the power transmission apparatus 10 via a network NW. The storage device 31 may be connected to the power reception apparatus 30 via the network NW.

In the embodiment, an example has been shown in which the power reception apparatus transmits a power supply request to the power transmission apparatus. However, the wireless transmission apparatus may perform wireless power supply to any power reception apparatus without receiving the power supply request. By way of example, the wireless transmission apparatus may perform wireless power supply according to a predetermined schedule, or may collect battery capacity information from the power reception apparatus to determine whether wireless power supply is necessary.

In the embodiment, the power reception class information is used as information on the power receiving capability. However, the information on the power receiving capability can be optionally determined. By way of example, the information on the power receiving capability may be information on the efficiency of the power receiver 35 with respect to the input power. FIG. 16 is a graph obtained by plotting efficiency with respect to input power. For example, regarding the efficiency, the minimum value of the input power range in which the drop from the maximum value is within a predetermined value or a predetermined ratio may be defined as Pmin, and the maximum value may be defined as Pmax.

In the embodiment, an example is shown in which the power ratios (Pmax/Pest and Pmin/Pest) of the maximum value Pmax and the minimum value Pmin to the estimated reception power (Pest) are calculated, respectively. However, when the power receiver 35 includes a plurality of power reception modules, the power density varies among the power reception modules.

Therefore, as shown in FIG. 29, the processor 12 may calculate the ratio (Pmax/Pest1) of the maximum value Pmax to the first estimated reception power (Pest1) and the ratio (Pmin/Pest2) of the minimum value Pmin to the second estimated reception power (Pest2). The first estimated reception power is the maximum value of the estimated reception power across the plurality of power reception modules. The second estimated reception power is the minimum value of the estimated reception power across the plurality of power reception modules. In FIG. 29, the ratio (Pmax/Pest1) represents an upper limit value of the power ratio at which all the modules can operate safely, and the ratio (Pmin/Pest2) represents a lower limit value of the power ratio at which all the modules can operate efficiently.

However, as shown in FIG. 30, when Pmax/Pest1>Pmin/Pest2 is not satisfied, the processor 12 may change the second estimated reception power to a larger value. Specifically, the processor 12 sets, as Pest2, the minimum value among the estimated reception powers of the plurality of power reception modules that can satisfy Pmax/Pest1>Pmin/Pest2. In the example shown in FIG. 30, an estimated reception power Pe1 of a module 1 is the minimum, but if the module 1 is to be operated efficiently, a module 2 cannot operate safely. Therefore, the estimated reception power Pe1 of the module 1 is excluded from candidates for the second estimated reception power. Then, the processor 12 selects, as the second estimated reception power, the estimated reception power Pe3 of a module 3 having the smallest estimated reception power among the remaining modules. In this case, Pmax/Pest1>Pmin/Pest2 is satisfied. In FIG. 30, the ratio (Pmax/Pest1) represents an upper limit value of the power ratio at which all the modules can operate safely, and the ratio (Pmin/Pest2) represents a lower limit value of the power ratio at which the modules 2, 3 can operate efficiently.

Thus, even when Pmax/Pest1>Pmin/Pest2 is not satisfied, changing of the second estimated reception power makes it possible to find a power range in which more modules can efficiently operate while ensuring safe operation of all the modules.

The power reception apparatus 30 may detect whether an output voltage is generated in each of the plurality of power reception modules provided for the power receiver 35 in receiving a test beam or a power transmission beam for which power for power supply is set. In addition, the power reception apparatus 30, when detecting a module having no output voltage generated, may transmit, for example, a power transmission end request to stop the power transmission. Before or after stopping the power transmission, the user may be notified of the stop of the power transmission. This can prevent a malfunction caused by irradiation with the beam to the power reception apparatus 30 in which part of its power reception module is out of order.

In the embodiment, it has been described that when there is an overlapping range (hereinafter referred to as a "recommended power-supply range") between the power ratio range (from Pmax/Pest to Pmin/Pest) and the gain range (from Gmax to Gmin), the processor 12 determines one gain (Gopt) from the recommended power-supply range. However, the processor 12 may not take into account the power ratio Pmin/Pest.

Specifically, when Pmax/Pest≥Gmax≥Gmin is satisfied, the processor 12 determines one gain (Gopt) from the gain range (from Gmax to Gmin). Further, when Gmax≥Pmax/Pest≥Gmin is satisfied, the processor 12 determines one gain (Gopt) from the gain range (from Pmax/Pest to Gmin).

When the power transmitter 15 emits a power transmission beam for which such power for power supply is set, the reception power in the power reception apparatus 30 is expected not to exceed the maximum value of the input power range of the power reception apparatus 30, and thus, the power reception apparatus 30 can operate safely.

In the embodiment, an example has been described in which the power transmission apparatus includes one power transmitter. However, the power transmission apparatus may include a plurality of power transmitters that can be individually controlled. In addition, the power transmitter and the other components (e.g., a controller) in the power transmission apparatus may be configured as separate apparatuses capable of communicating with each other. In other words, the power transmission apparatus may not include a power transmitter. In this case, the power transmitter may be incorporated into an apparatus that includes a communication interface for receiving a control parameter from the power transmission apparatus and a processor (e.g., a microcomputer) for driving the power transmitter in accordance with the control parameter from the power transmission apparatus.

Similarly, the power receiver and the other components (e.g., a controller) of the power reception apparatus may be configured as separate apparatuses capable of communicating with each other. In other words, the power reception apparatus may not include a power receiver.

In the embodiment, an antenna is given as an example of the beam-emitting element. However, when a lightwave is used as the electromagnetic wave for power supply, the beam-emitting element may be, for example, a light emitting device such as a laser device or an LED chip.

In the embodiment, an example is shown in which the power reception apparatus 30 transmits information on the power receiving capability of the power reception apparatus 30 (e.g., class information or input power range information)

to the power transmission apparatus 10. However, it is also possible that the power transmission apparatus 10 identifies information on the power receiving capability of the power reception apparatus 30 with the power reception apparatus 30 not transmitting the information on the power receiving capability. For example, the processor 12 may read a code (e.g., a two dimensional bar code) given to the power reception apparatus 30 or the cover covering the power reception apparatus 30, thereby reading the information on the power receiving capability.

Regarding Modifications 4 to 6, the static information (e.g., at least one of a size and a shape) of the power reception face can also be identified by techniques different from those described above.

For example, the processor 12 may read a code (e.g., a two dimensional bar code) given to the power reception apparatus 30 or the cover covering the power reception apparatus 30, thereby reading the information on the size of the power reception face.

In Modifications 4 to 6, an example is shown in which the distance from the camera to the target part is measured with reference to the image of the power reception apparatus 30 captured by the camera. The camera may be a stereo camera or a monocular camera. By using a monocular camera, the power transmission apparatus 10 can be realized in a smaller size and a lower cost than in the case of using a stereo camera. Hereinafter, an example of a technique for measuring a distance from a monocular camera to a target part with reference to an image of the power reception apparatus 30 captured by the monocular camera will be described.

As shown in FIG. 27, the monocular camera captures an image of a subject including a target part OP. As shown in FIG. 28, the processor 12 performs image processing on the image captured by the monocular camera, thereby extracting an area corresponding to the target part OP. The processor 12 counts the number of pixels in the area corresponding to the target part OP. Here, the number of pixels in the area corresponding to the target part OP depends on the distance from the monocular camera to the target part OP. Assuming that the number of pixels when the distance is L is S1 and the number of pixels when the distance is X is S2, $X = L \times \sqrt{(S1/S2)}$ is satisfied. By determining the reference distance L and the reference pixel number S1 as constants in advance, the processor 12 can derive X as a function of S2. By way of example, when the counting with L=100 [cm] and S1=600×400 [pixel] results in S2=300×200 [pixel], X=200 [cm] is obtained from the above equation.

The reference distance L and the reference pixel number S1 may be included in the static information of the power reception face. That is, the reference distance L and the reference pixel number S1 may be identified by reading information held in the code (e.g., a two dimensional bar code) given to the power reception apparatus 30 or the cover covering the power reception apparatus 30, or the power reception apparatus 30 may transmit such information to the power transmission apparatus 10.

The position of the power reception face can also be identified by techniques different from those described above.

As a first example, the power reception apparatus 30 may identify the position of the power transmission face with respect to the power reception face, for example, with reference to a sensing result of the optical sensor (an example of the input device 36) and transmit information on the identified position to the power transmission apparatus 10. The power transmission apparatus 10 can identify the relative position of the power reception face with respect to the power transmission face by converting the position identified by the power reception apparatus 30 such that the position of the power transmission face will be the origin.

As a second example, the power reception apparatus 30 may be fixed by a support provided such that the relative position of the power reception face with respect to the power transmission face will take a predetermined value. This enables the processor 12 to identify the position of the power reception face as a predetermined value without measuring the relative position of the power reception face with respect to the power transmission face. The predetermined value may be saved into the storage device 11 prior to the start of wireless power supply.

As a third example, the power transmission apparatus 10 measures absolute coordinates (e.g., latitude, longitude, and altitude) of the power transmission face using, for example, a Global Positioning System (GPS). Similarly, the power reception apparatus 30 measures the absolute coordinates of the power reception face using, for example, GPS, and transmits information on the measured absolute coordinates to the power transmission apparatus 10. The power transmission apparatus 10 can identify the relative position of the power reception face with respect to the power transmission face by subtracting the absolute coordinates of the power transmission face from the absolute coordinates of the power reception face.

The orientation of the power reception face can also be identified by techniques different from those described above.

Specifically, the processor 12 may identify the orientation of the power reception face with reference to the sensing result of the optical sensor. By way of example, the processor 12 can identify the orientation of the power reception face by performing image processing (e.g., extraction of vertexes of the power reception face and matching of the extracted vertexes with the shape of the power reception face) on the image of the power reception apparatus 30 captured by the camera.

As a second example, the power reception apparatus 30 may be fixed by a support provided such that the orientation of the power reception face with respect to the power transmission face will take a predetermined value. This enables the processor 12 to identify the orientation of the power reception face as a predetermined value without measuring the orientation of the power reception face with respect to the power transmission face. The predetermined value may be saved into the storage device 11 prior to the start of wireless power supply.

In Modifications 4 to 6, an example is shown in which a control parameter is generated with reference to the position, size, shape, and orientation of the power reception face. However, the control parameter may be generated without reference to at least one of the shape and the orientation.

As a first example, the processor 12 may generate the control parameter such that the power transmission beam emitted from the power transmitter 15 will be focused on a spot suitable for the size of the power reception face at the position of the power reception face.

As a second example, the processor 12 may generate the control parameter such that the power transmission beam emitted from the power transmitter 15 will be focused on a spot suitable for the size of the power reception face and the shape of the power reception face at the position of the power reception face.

As a third example, the processor 12 may generate the control parameter such that the power transmission beam emitted from the power transmitter 15 will be focused on a spot suitable for the size of the power reception face and the orientation of the power reception face at the position of the power reception face.

In Modifications 4 to 6, an example is shown in which after step S240, the power transmission end determination (S250) is executed. However, step S250 may be executed with other timing than this. For example, at the time of the occurrence of a predetermined interrupt event, the processor 12 may immediately execute step S250 to determine that the power transmission has ended. The interrupt event may include, for example, at least one of the following:

The capacity of the battery of the power reception apparatus 30 has reached a threshold value;
The power reception apparatus 30 can no longer be detected;
A power transmission end request has been received from the power reception apparatus 30;
A vibration of the power reception apparatus 30 has been detected (the power reception apparatus 30 can transmit a vibration detection signal when a vibration of the power reception apparatus 30 is detected by a vibration sensor provided for the power reception apparatus 30);
A human sensor connected to the power transmission apparatus 10 has detected a person;
A power transmission end signal has been received; and
A predetermined time has elapsed since the start of wireless power transmission.

Although the embodiment of the present invention has been described in detail above, the scope of the present invention is not limited to the above-described embodiment. Further, various improvements and changes can be made to the above-described embodiment without departing from the gist of the present invention. The above-described embodiment and modifications can be combined.

The invention claimed is:

1. A power transmission apparatus comprising a controller that controls a power transmitter that performs wireless power transmission, the controller comprising a processor and a memory with instructions thereon, wherein the instructions upon execution by the processor, cause the processor to:
cause the power transmitter to emit a first power transmission beam for which a first power is set;
acquire feedback information on a result of reception of the first transmission beam in a power reception apparatus;
identify a power receiving capability of the power reception apparatus; and
determine, with reference to the power receiving capability and the reception result, a second power which is usable for wireless power supply for the power reception apparatus and which is larger than the first power; and
the power receiving capability including a maximum value of an input power range of the power reception apparatus, and
the wireless power transmission using an electromagnetic wave having a frequency equal to or higher than that of a microwave, and wherein
the instructions upon execution by the processor, cause the processor to:
identify at least a minimum value and the maximum value of the input power range, and
determine the second power such that a reception power in the power reception apparatus falls within the input power range when the power transmitter emits a second power transmission beam for which the second power is set.

2. The power transmission apparatus according to claim 1, wherein the feedback information includes information on a reference voltage detected in the power reception apparatus, and
the instructions upon execution by the processor, cause the processor to determine, with reference to the information on the reference voltage, the second power such that a reception power in the power reception apparatus falls within the input power range when the power transmitter emits the second power transmission beam for which the second power is set.

3. The power transmission apparatus according to claim 1, wherein the feedback information includes information on a reception power for the first power transmission beam in the power reception apparatus,
the instructions upon execution by the processor, cause the processor to determine, with reference to the information on the reception power, the second power such that a reception power in the power reception apparatus falls within the input power range when the power transmitter emits a second power transmission beam for which the second power is set.

4. The power transmission apparatus according to claim 1, wherein the feedback information includes information on a power ratio calculated with reference to the reception result and the power receiving capability, and
the instructions upon execution by the processor, cause the processor to determine, with reference to the information on the power ratio, the second power such that a reception power in the power reception apparatus falls within the input power range when the power transmitter emits the second power transmission beam for which the second power is set.

5. A power transmission control method for controlling a power transmitter that performs wireless power transmission, the method comprising causing a computer to:
cause the power transmitter to emit a first power transmission beam for which a first power is set;
acquire feedback information on a result of reception of the first transmission beam in a power reception apparatus;
identify a power receiving capability in the power reception apparatus; and
determine, with reference to the power receiving capability and the reception result, a second power which is usable for wireless power supply for the power reception apparatus and which is larger than the first power,
the power receiving capability including a maximum value of an input power range of the power reception apparatus, and
the wireless power transmission using an electromagnetic wave having a frequency equal to or higher than that of a microwave, and wherein
the method comprising causing a computer to:
identify at least a minimum value and the maximum value of the input power range, and
determine the second power such that a reception power in the power reception apparatus falls within the input power when the power transmitter emits a second power transmission beam for which the second power is set.

6. A power reception apparatus comprising a controller that controls a power receiver that receives a power transmission beam emitted from a power transmission apparatus, the controller comprising a processor and a memory with instructions thereon, wherein the instructions upon execution by the processor, cause the processor to:

transmit, to the power transmission apparatus, feedback information on a result of reception of a first power transmission beam emitted from the power transmission apparatus in the power receiver and on a power receiving capability in the power receiver, and after transmission of the feedback information, the power receiver receiving, from the power transmission apparatus, a second power transmission beam having a power level higher than that of the first power transmission beam, the power receiving capability including a minimum value and a maximum value of an input power range of the power receiver, and wireless power transmission by the power transmission apparatus using an electromagnetic wave having a frequency equal to or higher than that of a microwave, and wherein the second power is determined such that a reception power in the power receiver due to the second power transmission beam falls within the input power range.

7. A power transmission apparatus comprising a controller that controls a power transmitter that performs wireless power transmission, the controller comprising a processor and a memory with instructions thereon, wherein the instructions upon execution by the processor, cause the processor to:

cause the power transmitter to emit a first power transmission beam for which a first power is set;

acquire feedback information on a result of reception of the first transmission beam in a power reception apparatus;

identify a power receiving capability of the power reception apparatus; and determine, with reference to the power receiving capability and the reception result, a second power which is usable for wireless power supply for the power reception apparatus and which is larger than the first power; and the power receiving capability including a maximum value of an input power range of the power reception apparatus, and the wireless power transmission using an electromagnetic wave having a frequency equal to or higher than that of a microwave, and wherein the input power range is a range of a reception power corresponding to an efficiency in which a drop from a maximum value of an efficiency with respect to the reception power in the power reception apparatus is within a predetermined value or within a predetermined ratio.

8. A power transmission apparatus comprising a controller that controls a power transmitter that performs wireless power transmission, the controller comprising a processor and a memory with instructions thereon, wherein the instructions upon execution by the processor, cause the processor to:

cause the power transmitter to emit a first power transmission beam for which a first power is set;

acquire feedback information on a result of reception of the first transmission beam in a power reception apparatus;

identify a power receiving capability of the power reception apparatus; and determine, with reference to the power receiving capability and the reception result, a second power which is usable for wireless power supply for the power reception apparatus and which is larger than the first power; and the power receiving capability including a maximum value of an input power range of the power reception apparatus, and the wireless power transmission using an electromagnetic wave having a frequency equal to or higher than that of a microwave, and wherein the power reception apparatus comprises a plurality of power reception modules, and the feedback information includes information on a reception result in a first power reception module having a reception power largest among the plurality of power reception modules, and information on a reception result in a second power reception module that is different from the first power reception module among the plurality of power reception modules.

* * * * *